United States Patent
Young et al.

(10) Patent No.: US 10,109,855 B2
(45) Date of Patent: *Oct. 23, 2018

(54) HYDROGEN STORAGE ALLOYS

(71) Applicant: BASF Corporation, Florham Park, NJ (US)

(72) Inventors: Kwo Young, Troy, MI (US); Diana Wong, Sterling Heights, MI (US); Benjamin Chao, Troy, MI (US); Michael A. Fetcenko, Rochester, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/619,549

(22) Filed: Feb. 11, 2015

(65) Prior Publication Data
US 2016/0233497 A1    Aug. 11, 2016

(51) Int. Cl.
| | |
|---|---|
| *C22C 30/00* | (2006.01) |
| *H01M 4/38* | (2006.01) |
| *H01M 8/083* | (2016.01) |
| *H01M 10/34* | (2006.01) |
| *H01M 12/08* | (2006.01) |

(52) U.S. Cl.
CPC ............ *H01M 4/385* (2013.01); *C22C 30/00* (2013.01); *H01M 4/383* (2013.01); *H01M 8/083* (2013.01); *H01M 10/345* (2013.01); *H01M 12/08* (2013.01); *Y02E 60/128* (2013.01)

(58) Field of Classification Search
CPC ............................ C22C 2202/04; C22C 30/00
USPC ............... 148/442; 252/182.1; 420/580, 900; 429/223
See application file for complete search history.

(56) References Cited

U.S. PATENT DOCUMENTS

| | | | |
|---|---|---|---|
| 5,840,440 A | 11/1998 | Ovshinsky et al. | |
| 6,270,719 B1 | 8/2001 | Fetcenko et al. | |
| 6,536,487 B2 | 3/2003 | Ovshinsky et al. | |
| 2013/0277607 A1 | 10/2013 | Young et al. | |

FOREIGN PATENT DOCUMENTS

| | | |
|---|---|---|
| JP | H1150263 | 2/1999 |
| JP | 2012-227106 A | 11/2012 |

(Continued)

OTHER PUBLICATIONS

K. Young, et al., Journal of Power Sources, 215 (2012) 279-287.

(Continued)

*Primary Examiner* — Brian D Walck
(74) *Attorney, Agent, or Firm* — Lowenstein Sandler LLP

(57) ABSTRACT

Hydrogen storage alloys comprising a metal oxide containing ≥60 at % oxygen; and/or comprising a metal region adjacent to a boundary region, which boundary region comprises at least one channel; and/or comprising a metal region adjacent to a boundary region, where the boundary region has a length and an average width, where the average width is from about 12 nm to about 1100 nm; and/or comprising a metal oxide zone comprising a metal oxide, which oxide zone is aligned with at least one channel; and/or comprising a Ni/Cr metal oxide have improved electrochemical properties, for instance improved low temperature electrochemical performance.

27 Claims, 9 Drawing Sheets

(56) References Cited

FOREIGN PATENT DOCUMENTS

WO     2004/094680 A1    11/2004
WO     2014/107732 A2    7/2014

OTHER PUBLICATIONS

K. Young, et al., Materials, 6 (2013) 4574-4608.
K. Young, et al., Journal of Alloys & Compounds, 580 (2013) S349-S352.
English Language Abst. of JP 2012-227106, Nov. 15, 2012.
Int. Search Report/Written Opinion dated May 31, 2016.
Young et al., Electrochimica Acta, vol. 174, pp. 815-825 Jun. 20, 2015.
Young, et al. "Improvement in −40 C Electrochemical Properties of AB2 Metal Hydride Alloy by Silicon Incorporation" Journal of Alloys and Compounds 575 (2013) 61-72, 9 pages.
Young, et al. Microstructures of the Activated Si-Containing AB2 Metal Hydride Alloy Surface by Transmission Electron Microscope, Batteries 2016, 2, 4; doi:10.3390/batteries2010004, 13 pages.

HYDROGEN STORAGE ALLOYS

The present invention relates to hydrogen storage alloys having improved electrochemical properties. The alloys are for example modified $AB_x$ type alloys where x is from about 0.5 to about 5.

Alloys capable of absorbing and desorbing hydrogen may be employed as hydrogen storage media and/or as electrode materials for solid hydrogen storage media, metal hydride batteries, fuel cells, metal hydride air battery systems and the like. Such materials are known as metal hydride (MH) materials.

Efforts continue to improve the electrochemical properties of ABx MH alloys, employed for example as the negative electrode active material in batteries. Nickel metal hydride (NiMH) batteries are a green technology and have replaced toxic nickel cadmium (NiCd) batteries in all applications except those that require discharge capability at low temperature (e.g. <25° C.). Further improvement of low temperature electrochemical performance of ABx metal hydride alloys will allow complete removal of NiCd batteries from the consumer market.

Surprisingly, it has been found that certain metal hydride alloys exhibit improved electrochemical properties, for instance improved low temperature electrochemical properties.

Disclosed is a hydrogen storage alloy, comprising
a) at least one electrochemically active main phase and
b) at least one electrochemically active secondary phase.

Also disclosed is a hydrogen storage alloy comprising
a) at least one main phase,
b) a storage secondary phase comprising one or more rare earth elements and
c) a catalytic secondary phase,
where the abundance of the storage secondary phase is >0.5 wt % and the abundance of the catalytic secondary phase is from about 0.3 to about 15 wt %, based on the alloy.

Also disclosed is a hydrogen storage alloy which exhibits an high rate dischargeability of ≥93% at the $3^{rd}$ cycle, defined as the ratio of discharge capacity measured at 50 mA $g^{-1}$ to that measured at 4 mA $g^{-1}$, measured in a flooded cell configuration against a partially pre-charged $Ni(OH)_2$ positive electrode with no alkaline pretreatment applied before the half-cell measurement and where each sample electrode is charged at a constant current density of 50 mA $g^{-1}$ for 10 h and then discharged at a current density of 50 mA $g^{-1}$ followed by two pulls at 12 and 4 mA $g^{-1}$; and/or
a charge transfer resistance (R) at −40° C. for the main phase or main phases of ≤60 Ω·g; and/or
a charge transfer resistance (R) at −40° C. of ≤60 Ω·g; and/or
a surface catalytic ability at −40° C. for the main phase or main phases of ≤30 seconds.

Also disclosed is a hydrogen storage alloy comprising a metal oxide containing ≥60 at % oxygen.

Also disclosed is a hydrogen storage alloy comprising a metal region adjacent to a boundary region, which boundary region comprises at least one channel.

Also disclosed is a hydrogen storage alloy comprising a metal region adjacent to a boundary region, where the boundary region has a length and an average width, where the average width is from about 12 nm to about 1100 nm.

Also disclosed is a hydrogen storage alloy comprising a metal oxide zone comprising a metal oxide, which oxide zone is aligned with at least one channel.

Also disclosed is a hydrogen storage alloy comprising a Ni/Cr metal oxide.

The present hydrogen storage alloys have improved electrochemical properties, for instance improved low temperature electrochemical performance.

DETAILED DISCLOSURE

The present alloys are for example modified ABx type metal hydride (MH) alloys where in general, A is a hydride forming element and B is a weak or non-hydride forming element. A is in general a larger metallic atom with 4 or less valence electrons and B is in general a smaller metallic atom with 5 or more valence electrons. Suitable ABx alloys include those where x is from about 0.5 to about 5. The present alloys are capable of reversibly absorbing (charging) and desorbing (discharging) hydrogen. For example, present alloys are capable of reversibly absorbing and desorbing hydrogen electrochemically at ambient conditions (25° C. and 1 atm).

ABx type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$) and $AB_5$ ($LaNi_5$, $CeNi_5$).

The present alloys are for example obtained by modifying an ABx type base alloy (at least one A and one B element) with one or more modifying elements. Modification also includes judicious selection of metals and their atomic ratios and control of processing parameters during solidification, post-solidification processing, annealing and processing or operation of a hydrogen storage alloy. Annealing can be performed in vacuum, partial vacuum, or an inert gas environment followed by a nature, forced air, or quick cooling. Modification also includes activation techniques, such as etching, pre-oxidation, electrodeless and electrical plating and coating. Etching steps may include basic and/or acidic etching processes to selectively or preferentially etch one or more elements or oxides or hydroxides or phases in the interface region of a hydrogen storage alloy.

Prior to use, metal or metal alloy electrodes are typically activated, a process in which native surface oxides in the interface region are removed or reduced. The process of activation may be accomplished via etching, electrical forming, pre-conditioning or other suitable methods for altering surface oxides. Activation may be applied to an electrode alloy powder, a finished electrode or any point in between.

The present alloys may be obtained by employing a combination of the above techniques. Alloys to be modified according to the present invention are "base alloys".

Suitable modifying elements include rare earth elements, Si, Al and V. Rare earth elements are Sc, Y, La and the Lanthanides. Mischmetal (Mm) is included with the term "one or more rare earth elements". The rare earth element is for instance La.

Metal hydride base alloys include alloys containing Ti, V and Mn (Ti—V—Mn alloys) and alloys containing Ti, V and Fe. For instance hydrides of alloys containing from about 31 to about 46 atomic percent Ti, from about 5 to about 33 atomic percent V and from about 36 to about 53 atomic percent Mn and/or Fe. Suitable alloys are taught for instance in U.S. Pat. No. 4,111,689.

Metal hydride base alloys include alloys of formula ABx where A comprises from about 50 to below 100 atomic percent Ti and the remainder is Zr and/or Hf and B comprises from about 30 to below 100 atomic percent of Ni and the remainder is one or more elements selected from Cr, V, Nb, Ta, Mo, Fe, Co, Mn, Cu and rare earths and x is from about 1 to about 3. These alloys are taught for example in U.S. Pat. No. 4,160,014.

Metal hydride base alloys include alloys of formula $(TiV_{2-x}Ni_x)_{1-y}M_y$ where x is from about 0.2 to about 1.0 and M is Al and/or Zr; alloys of formula $Ti_{2-x}Zr_xV_{4-y}Ni_y$ where x is from 0 to about 1.5 and y is from about 0.6 to about 3.5; and alloys of formula $Ti_{1-x}Cr_xV_{2-y}Ni_y$ where x is from 0 to about 0.75 and y is from about 0.2 to about 1.0. These base alloys are disclosed for example in U.S. Pat. No. 4,551,400.

Metal hydride base alloys for example comprise one or more elements selected from the group consisting of Mg, Ti, V, Zr, Nb, La, Si, Ca, Sc and Y and one or more elements selected from the group consisting of Cu, Mn, Fe, Ni, Al, Mo, W, Ti, Re and Co. For instance, MH base alloys may comprise one or more elements selected from Ti, Mg and V and comprise Ni. Advantageously, MH base alloys comprise Ti and Ni, for instance in an atomic range of from about 1:4 to about 4:1. Advantageously, MH base alloys comprise Mg and Ni, for instance in an atomic range of from about 1:2 to about 2:1. Suitable base alloys are disclosed for example in U.S. Pat. No. 4,623,597.

Base alloys include those of formula $(Ti_{2-x}Zr_xV_{4-y}Ni_y)_{1-z}Cr_z$ where x is from 0 to about 1.5, y is from about 0.6 to about 3.5 and z is $\leq 0.2$. These base alloys are taught for instance in U.S. Pat. No. 4,728,586.

Metal hydride base alloys for instance comprise V, Ti, Zr and Ni (Ti—V—Zr—Ni alloys) or V, Ti, Zr, Ni and Cr. For instance, MH base alloys comprise Ti, V and Ni and one or more elements selected from Cr, Zr and Al. For example, MH base alloys include $V_{22}Ti_{16}Zr_{16}Ni_{39}Cr_7$, $(V_{22}Ti_{16}Zr_{16}N_{39}Cr_7)_{95}Al_5$, $(V_{22}Ti_{16}Zr_{16}N_{39}Cr_7)_{95}Mn_5$, $(V_{22}Ti_{16}Zr_{16}N_{39}Cr_7)_{95}Mo_5$, $(V_{22}Ti_{16}Zr_{16}N_{39}Cr_7)_{95}Cu_5$, $(V_{22}Ti_{16}Zr_{16}N_{39}Cr_7)_{95}W_5$, $(V_{22}Ti_{16}Zr_{16}N_{39}Cr_7)_{95}Fe_5$, $(V_{22}Ti_{16}Zr_{16}N_{39}Cr_7)_{95}Co_5$, $V_{22}Ti_{16}Zr_{16}N_{32}Cr_7Co_7$, $V_{20.6}Ti_{15}Zr_{15}N_{30}Cr_{6.6}Co_{6.6}Mn_{3.6}Al_{2.7}$ and $V_{22}Ti_{16}Zr_{16}N_{27.8}Cr_7Co_{5.9}Mn_{30.1}Al_{2.2}$ alloys. For instance, MH base alloys include alloys of formula $(V_{y'-y}Ni_y Ti_{x'-x}Zr_xCr_z)_aM_b$ where y' is from about 3.6 to about 4.4, y is from about 0.6 to about 3.5, x' is from about 1.8 to about 2.2, x is from 0 to about 1.5, z is from 0 to about 1.44, a is from about 70 to about 100, b is from 0 to about 30 and M is one or more elements selected from the group consisting of Al, Mn, Mo, Cu, W, Fe and Co. Values are atomic percent (at %). Suitable MH base alloys are taught for instance in U.S. Pat. No. 5,096,667.

Base alloys include those of formula (metal alloy)$_a$Co$_b$Mn$_c$Fe$_d$Sn$_e$ where (metal alloy) comprises from about 0.1 to about 60 at % Ti, from about 0.1 to about 40 at % Zr, from 0 to about 60 at % V, from about 0.1 to about 57 at % Ni and from 0 to about 56 at % Cr; b is 0 to about 7.5 at %, c is from about 13 to about 17 at %, d is from 0 to about 3.5 at % and e is from 0 to about 1.5 at %, where a+b+c+d+e=100 at %. Suitable MH base alloys are taught for example in U.S. Pat. No. 5,536,591.

Metal hydride base alloys include $LaNi_5$ type alloys, alloys containing Ti and Ni and alloys containing Mg and Ni. Ti and Ni containing alloys may further contain one or more of Zr, V, Cr, Co, Mn, Al, Fe, Mo, La or Mm (mischmetal). Mg and Ni containing alloys may further contain one or more elements selected from Co, Mn, Al, Fe, Cu, Mo, W, Cr, V, Ti, Zr, Sn, Th, Si, Zn, Li, Cd, Na, Pb, La, Mm, Pd, Pt and Ca. Suitable base alloys are taught for instance in U.S. Pat. No. 5,554,456.

Metal hydride base alloys are for example $LaNi_5$ or TiNi based alloys. For example, MH base alloys include one or more hydride forming elements selected from the group consisting of Ti, V and Zr and one or more elements selected from the group consisting of Ni, Cr, Co, Mn, Mo, Nb, Fe, Al, Mg, Cu, Sn, Ag, Zn and Pd. For example, MH base alloys comprise one or more hydride forming elements selected from the group consisting of Sc, Y, La, Ce, Pr, Nd, Sm and Mm and one or more elements selected from the group consisting of Ni, Cr, Co, Mn, Fe, Cu, Sn, Al, Si, B, Mo, V, Nb, Ta, Zn, Zr, Ti, Hf and W. MH base alloys may include one or more elements selected from the group consisting of Al, B, C, Si, P, S, Bi, In and Sb.

Base alloys include $(Mg_xNi_{1-x})_aM_b$ alloys where M is one or more elements selected from the group consisting of Ni, Co, Mn, Al, Fe, Cu, Mo, W, Cr, V, Ti, Zr, Sn, Th, Si, Zn, Li, Cd, Na, Pb, La, Mm, Pd, Pt and Ca; b is from 0 to about 30 atomic percent, a+b=100 atomic percent and x is from about 0.25 to about 0.75.

The base alloys also include hydrides of alloys of formula $ZrMo_dNi_e$ where d is from about 0.1 to about 1.2 and e is from about 1.1 to about 2.5 Base alloys include alloys of formula $ZrMn_wV_xM_yNi_z$ where M is Fe or Co and w is from about 0.4 to about 0.8 at %, x is from about 0.1 to about 0.3 at %, y is from 0 to about 0.2 at %, z is from about 1 to about 1.5 at % and w+x+y+z is from about 2 to about 2.4 at %.

MH base alloys include alloys of formula $LaNi_5$ where La or Ni is substituted by one or more metals selected from periodic groups Ia, II, III, IV and Va other than lanthanides, in an atomic percent from about 0.1 to about 25.

MH base alloys include those of formula $TiV_{2-x}Ni_x$ where x is from about 0.2 to about 0.6.

MH base alloys also include alloys of formula $Ti_aZr_bNi_cCr_dM_x$ where M is one or more elements selected from the group consisting of Al, Si, V, Mn, Fe, Co, Cu, Nb, Ag and Pd, a is from about 0.1 to about 1.4, b is from about 0.1 to about 1.3, c is from about 0.25 to about 1.95, d is from about 0.1 to about 1.4, x is from 0 to about 0.2 and a+b+c+d=about 3.

MH base alloys include alloys of formula $Ti_{1-x}Zr_x Mn_{2-y-z}Cr_yV_z$ where x is from about 0.05 to about 0.4, y is from 0 to about 1.0 and z is from 0 to about 0.4.

MH base alloys also include those of formula $LnM_5$ where Ln is one or more lanthanides and M is Ni and/or Co.

Base alloys for example comprise from about 40 to about 75 weight percent of one or more elements selected from periodic groups II, IV and V and one or more metals selected from the group consisting of Ni, Cu, Ag, Fe and Cr—Ni steel.

MH base alloys may also comprise a main texture Mm-Ni system. Base alloys suitable for modification are taught for instance in U.S. Pat. No. 5,840,440.

Metal hydride base alloys for instance comprise V, Ti, Zr, Ni, Cr and Mn. For instance, MH base alloys comprise V, Ti, Zr, Ni, Cr, Mn and Al; V, Ti, Zr, Ni, Cr, Mn and Sn; V, Ti, Zr, Ni, Cr, Mn and Co; V, Ti, Zr, Ni, Cr, Mn, Al, Sn and Co; or comprise V, Ti, Zr, Ni, Cr, Mn, Al, Sn, Co and Fe. MH base alloys include alloys of formula (metal alloy)$_a$Co$_b$Fe$_c$Al$_d$Sn$_e$ where (metal alloy) comprises from about 0.1 to about 60 at % Ti, from about 0.1 to about 40 at % Zr, from 0 to about 60 at % V, from about 0.1 to about 57 at % Ni, from about 5 to about 22 at % Mn and from 0 to 56 at % Cr, b is from about 0.1 to about 10 at %, c is from 0 to about 3.5 at %, d is from about 0.1 to 10 at %, e is from about 0.1 to about 3 at % and a+b+c+d+e=100 at %. Suitable MH base alloys are taught for example in U.S. Pat. No. 6,270,719.

Metal hydride base alloys include one or more alloys selected from the group consisting of AB, $AB_2$, $AB_5$ and $A_2B$ type alloys where A and B may be transition metals, rare earths or combinations thereof where component A generally has a stronger tendency to form hydrides than component B. In AB hydrogen storage base alloys, A for instance comprises one or more elements selected from the group consisting of Ti, Zr and V and B comprises one or more elements selected from the group consisting of Ni, V, Cr, Co, Mn, Mo, Nb, Al, Mg, Ag, Zn and Pd. AB base alloys include ZrNi, ZrCo, TiNi, TiCo and modified forms thereof. $A_2B$ type base alloys include $Mg_2Ni$ and modified forms thereof according to Ovshinsky principles where either or both of Mg and Ni are wholly or partially replaced by a multi-orbital modifier. $AB_2$ type base alloys are Laves phase compounds and include alloys where A comprises one or more elements selected from the group consisting of Zr and Ti and B comprises one or more elements selected from the group consisting of Ni, V, Cr, Mn, Co, Mo, Ta and Nb. $AB_2$ type base alloys include alloys modified according to the Ovshinsky principles. $AB_5$ metal hydride base alloys include those where A comprises one or more elements selected from the group consisting of lanthanides and B comprises one or more transition metals. Included are $LaNi_5$ and $LaNi_5$ where Ni is partially replaced by one or more elements selected from the group consisting of Mn, Co, Al, Cr, Ag, Pd, Rh, Sb, V and Pt and/or where La is partially replaced by one or more elements selected from the group consisting of Ce, Pr, Nd, other rare earths and Mm. Included also are $AB_5$ type base alloys modified according to the Ovshinsky principles. Such base alloys are taught for instance in U.S. Pat. No. 6,830,725.

Base alloys include $TiMn_2$ type alloys. For instance metal hydride base alloys comprise Zr, Ti, V, Cr, and Mn where Zr is from about 2 to about 5 at %, Ti is from about 26 to about 33 at %, V is from about 7 to about 13 at %, Cr is from about 8 to about 20 at % and Mn is from about 36 to about 42 at %. These alloys may further include one or more elements selected from the group consisting of Ni, Fe and Al, for instance from about 1 to about 6 at % Ni, from about 2 to about 6 at % Fe and from about 0.1 to about 2 at % Al. These base alloys may also contain up to about 1 at % Mm. Alloys suitable for modification include $Zr_{3.63}Ti_{29.8}V_{8.82}Cr_{9.85}Mn_{39.5}Ni_{2.0}Fe_{5.0}Al_{1.0}Mm_{0.4}$; $Zr_{3.6}Ti_{29.0}V_{8.9}Cr_{10.1}Mn_{40.1}Ni_{2.0}Fe_{5.1}Al_{1.2}$; $Zr_{3.6}Ti_{28.3}V_{8.8}Cr_{10.0}Mn_{40.7}Ni_{1.9}Fe_{5.1}Al_{1.6}$ and $Zr_1Ti_{33}V_{12.54}Cr_{15}Mn_{36}Fe_{2.25}Al_{0.21}$. Suitable base alloys are taught for example in U.S. Pat. No. 6,536,487.

Metal hydride base alloys may comprise 40 at % or more of $A_5B_{19}$ type structures of formula $La_aR_{1-a-b}Mg_bNi_{c-d-e}$ where $0≤a≤0.5$ at %, $0.1≤b≤0.2$ at %, $3.7≤c≤3.9$ at %, $0.1≤d≤0.3$ and $0≤d≤0.2$. Suitable base alloys are taught for instance in U.S. Pat. No. 7,829,220.

The alloys of this invention may be in the form of hydrogen-absorbing alloy particles containing at least Ni and a rare earth. The particles may have a surface layer and an interior where the surface layer has a nickel content greater than that of the interior and nickel particles having a size of from about 10 nm to about 50 nm are present in the surface layer. Metal hydride base alloys may be of formula $Ln_{1-x}Mg_xNi_{a-b-c}Al_bZ_c$, where Ln is one or more rare earth elements, Z is one or more of Zr, V, Bn, Ta, Cr, Mo, Mn, Fe, Co, Ga, Zn, Sn, In, Cu, Si, P and B, $0.05≤x≤0.3$ at %, $2.8≤a≤3.9$ at %, $0.05≤b≤0.25$ at % and $0.01≤c≤0.25$. Suitable base alloys are taught for example in U.S. Pat. No. 8,053,114.

The alloys of this invention may comprise a crystalline structure having multiple phases containing at least an $A_2B_7$ type structure and an $A_5B_{19}$ type structure and a surface layer having a nickel content greater than that of the bulk. Metal hydride base alloys include alloys of formula $Ln_{1-x}Mg_xNi_{y-a-b}Al_aM_b$, where Ln is one or more rare earths including Y, M is one or more of Co, Mn and Zn, where $0.1≤x≤0.2$ at %, $3.5≤y≤3.9$ at %, $0.1≤a≤0.3$ at % and $0≤b≤0.2$. Suitable base alloys are disclosed for example in U.S. Pat. No. 8,124,281.

Metal hydride base alloys may be of formula $Ln_{1-x}Mg_x(Ni_{1-y}T_y)_z$ where Ln is one or more elements selected from lanthanide elements, Ca, Sr, Sc, Y, Ti, Zr and Hf, T is one or more elements selected from V, Nb, Ta, Cr, Mo, Mn, Fe, Co, Al, Ga, Zn, Sn, In, Cu, Si, P and B and where $0<x≤1$ at %, $0≤y≤0.5$ at %, and $2.5≤z≤4.5$ at %. Suitable base alloys are taught for instance in U.S. Pat. No. 8,257,862.

The alloys of this invention may comprise La, Nd, Mg, Ni and Al; La, Nd, Mg, Ni, Al and Co; La, Pr, Nd, Mg, Ni and Al or La, Ce, Pr, Nd, Ni, Al, Co and Mn as taught in U.S. Pat. No. 8,409,753.

Metal hydride base alloys may be of formula $Ti_AZr_{B-X}Y_XV_CNi_DM_E$ where A, B, C and D are each greater than 0 and less than or equal to 50 at %, X is greater than 0 and less than or equal to 4 at %, M is one or more metals selected from Co, Cr, Sn, Al and Mn and E is from 0 to 30 at %. Suitable base alloys are taught for example in U.S. Pub. No. 2013/0277607.

The alloys of this invention include modified $A_2B_7$ type hydrogen storage alloys. For instance, the MH base alloys may be $A_xB_y$ alloys where A includes at least one rare earth element and also includes Mg; B includes at least Ni and the atomic ratio x to y is from about 1:2 to about 1:5, for instance about 1:3 to about 1:4. MH base alloys may further comprise one or more elements selected from the group consisting of B, Co, Cu, Fe, Cr and Mn. The atomic ratio of Ni to the further elements may be from about 50:1 to about 200:1. The rare earths include La, Ce, Nd, Pr and Mm. The atomic ratio of rare earths to Mg may be from about 5:1 to about 6:1. The B elements may further include Al where the atomic ratio of Ni to Al may be from about 30:1 to about 40:1.

Metal hydride base alloys include ABx high capacity hydrogen storage alloys where x is from about 0.5 to about 5 and which has a discharge capacity of ≥400 mAh/g, ≥425 mAh/g, ≥450 mAh/g or ≥475 mAh/g.

Metal hydride base alloys include high capacity MH alloys containing magnesium (Mg), for example an AB, $AB_2$ or $A_2B$ type alloy containing Mg and Ni. For instance, MH base alloys include MgNi, $MgNi_2$ and $Mg_2Ni$. Such Mg and Ni containing alloys may further comprise one or more elements selected from the group consisting of rare earth elements and transition metals. For instance, alloys containing Mg and Ni may further comprise one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

For instance, MH base alloys comprise Mg and Ni and optionally one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

Mm is "mischmetal". Mischmetal is a mixture of rare earth elements. For instance, Mm is a mixture containing La, Nd and Pr, for instance containing Ce, La, Nd and Pr.

For example, MH base alloys include MgNi, $Mg_{0.8}Ti_{0.2}Ni$, $Mg_{0.7}Ti_{0.3}Ni$, $Mg_{0.9}Ti_{0.1}Ni$, $Mg_{0.8}Zr_{0.2}Ni$, $Mg_{0.7}Ti_{0.225}La_{0.075}Ni$, $Mg_{0.8}Al_{0.2}Ni$, $Mg_{0.9}Ti_{0.1}Ni$, $Mg_{0.9}Ti_{0.1}NiAl_{0.05}$, $Mg_{0.08}Pd_{0.2}Ni$, $Mg_{0.09}Ti_{0.1}NiAl_{0.05}$, $Mg_{0.09}Ti_{0.1}NiAl_{0.05}Pd_{0.1}$, $Mg_{50}Ni_{45}Pd_5$, $Mg_{0.85}Ti_{0.15}Ni_{1.0}$, $Mg_{0.95}Ti_{0.15}Ni_{0.9}$, $Mg_2Ni$, $Mg_{2.0}Ni_{0.6}Co_{0.4}$, $Mg_2Ni_{0.6}Mn_{0.4}$, $Mg_2Ni_{0.7}Cu_{0.3}$, $Mg_{0.8}La_{0.2}Ni$, $Mg_{2.0}Co_{0.1}Ni$, $Mg_{2.1}Cr_{0.1}Ni$, $Mg_{2.0}Nb_{0.1}Ni$, $Mg_{2.0}Ti_{0.1}Ni$, $Mg_{2.0}V_{0.1}Ni$, $Mg_{1.3}Al_{0.7}Ni$, $Mg_{1.5}Ti_{0.5}Ni$, $Mg_{1.5}Ti_{0.3}Zr_{0.1}Al_{0.1}Ni$, $Mg_{1.75}Al_{0.25}Ni$ and $(MgAl)_2Ni$, $Mg_{1.70}Al_{0.3}Ni$.

For example, MH base alloys include alloys of Mg and Ni in an atomic ratio of from about 1:2 to about 2:1 further comprising one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca. The further element or elements may be present from about 0.1 to about 30 atomic percent (at %) or from about 0.25 to about 15 at % or from about 0.5, about 1, about 2, about 3, about 4 or about 5 at % to about 15 at %, based on the total alloy. The atomic ratio of Mg to Ni is for instance about 1:1. Thus, Mg and Ni together may be present from about 70 at % to about 99.9 at % based on the total alloy. Mg—Ni MH base alloys may be free of further elements where Mg and Ni together are present at 100 at %.

Metal hydride base alloys may comprise Mg and Ni in an atomic ratio of from about 1:2 to about 2:1 where Mg and Ni together are present at a level of ≥70 at %, based on the total alloy.

Metal hydride base alloys may comprise ≥20 at % Mg.

Metal hydride base alloys may comprise Mg and Ni in an atomic ratio of from about 1:2 to about 2:1 and further comprise Co and/or Mn. The alloys of this invention include modified $Mg_{52}Ni_{39}Co_6Mn_3$ or modified $Mg_{52}Ni_{39}Co_3Mn_6$.

Metal hydride base alloys may contain ≥90 weight % Mg and one or more additional elements. The one or more additional elements may be selected from the group consisting of Ni, Mm, Al, Y and Si. These alloys may contain for example from about 0.5 to about 2.5 weight % Ni and about 1.0 to about 4.0 weight % Mm. These alloys may also contain from about 3 to about 7 weight % Al and/or from about 0.1 to about 1.5 weight % Y and/or from about 0.3 to about 1.5 weight % Si.

Suitable high capacity MH base alloys are disclosed for example in U.S. Pat. Nos. 5,506,069, 5,616,432 and 6,193,929.

The alloys of this invention for instance may be capable of storing at least 6 weight % hydrogen and/or absorbing at least 80% of the full storage capacity of hydrogen in under 5 minutes at 300° C.; or may be capable of storing at least 6.5 weight % of hydrogen and/or absorbing 80% of the full storage capacity of hydrogen in under 2 minutes at 300° C.; or may be capable of storing at least 6.9 weight % of hydrogen and/or capable of absorbing 80% of the full storage capacity of hydrogen in under 1.5 minutes at 300° C.

Metal hydride base alloys include alloys of formula $Ti_aZr_{b-x}Y_xV_cNi_dM_e$ where each of a, b, c and d are greater than 0 and less than or equal to 50 at %, x is greater than 0 and less than or equal to 4 at %, M is one or more metals selected from the group consisting of Co, Cr, Sn, Al and Mn and e is from 0 to about 30 at %. These alloys are disclosed for example in U.S. Pub. No. 2013/0277607.

The present alloys may be prepared for instance via arc melting or induction melting under an inert atmosphere, by melt casting, rapid solidification, mechanical alloying, sputtering or gas atomization or other methods as taught in the above references.

Unless otherwise stated, amounts of elements in alloys or phases are in atomic percent (at %), based on the total alloy or phase.

Unless otherwise stated, amounts of individual phases are reported in weight percent (wt %), based on the total alloy.

The low temperature electrochemical performance may be defined by the charge transfer resistance (R) at −40° C.

Electrochemical performance may also be defined by high rate dischargeability (HRD).

Low temperature electrochemical performance may also be defined as surface catalytic ability at low temperature, for example −40° C. Surface catalytic ability is defined as the product of charge transfer resistance (R) and double layer capacitance (C), R·C. The R and C values are calculated from the curve-fitting of the Cole-Cole plot of AC impedance measurements.

Low temperature is defined for example at <25° C., ≤10° C., ≤0° C., ≤−10° C., ≤−20° C. or ≤−30° C.

Charge transfer resistance (R) is measured in Ω·g. Double layer capacitance (C) is measured in Farad/g.

AC impedance measurements herein are conducted with a SOLARTRON 1250 Frequency Response Analyzer with sine wave of amplitude 10 mV and frequency range of 0.1 mHz to 10 kHz. Prior to the measurements, the electrodes are subjected to one full charge/discharge cycle at 0.1 C rate using a SOLARTRON 1470 Cell Test galvanostat, charged to 100% state-of-charge (SOC), discharged to 80% SOC, then cooled to −40° C.

Half-cell HRD is defined as the ratio of discharge capacity measured at 50 mA $g^{-1}$ to that measured at 4 mA $g^{-1}$. The discharge capacity of an alloy is measured in a flooded cell configuration against a partially pre-charged $Ni(OH)_2$ positive electrode. No alkaline pretreatment is applied before the half-cell measurement. Each sample electrode is charged at a constant current density of 50 mA $g^{-1}$ for 10 h and then discharged at a current density of 50 mA $g^{-1}$ followed by two pulls at 12 and 4 mA $g^{-1}$. Capacities are measured at the $3^{rd}$ cycle.

Present alloys may advantageously contain multiple phases. For example, present alloys may contain at least one main phase and a secondary phase. For example, present alloys contain at least one main phase, a storage secondary phase and a catalytic secondary phase.

The main phase or main phases are electrochemically active. "Electrochemically active" means capable of reversibly absorbing and desorbing hydrogen electrochemically at ambient conditions (25° C. and 1 atm).

Advantageously, the storage secondary phase is also an electrochemically active phase. This is "observable" by the deviation from a conventional curve of a Cole-Cole plot of AC impedance measurements; for example, the presence of an additional curve in a Cole-Cole plot. For example, a Cole-Cole plot of a present alloy contains two curves where one curve relates to the active main phase(s) and one relates to an active secondary phase.

For example, deviation from a conventional curve of a Cole-Cole plot of AC impedance measurements taken at low temperature, e.g. −40° C., is observed for present alloys. This indicates that a secondary phase, in addition to the main phase(s) is electrochemically active at −40° C. Present alloys may contain an electrochemically active main phase(s) and an electrochemically active secondary phase at −40° C.

A Cole-Cole plot of AC impedance measurements is achieved via curve-fitting.

In a conventional metal hydride alloy, only one curve is present in a Cole-Cole plot relating to the main phase or main phases. Deviation from a conventional curve is observed by the presence of at least one inflection point. For a normal curve, the slope of the tangent at any point will decrease along the x axis (a concave curve). At an inflection point, the slope of the tangent will begin to increase. An inflection point indicates the emergence of a second curve.

The term "where each active phase may be distinctly represented in a Cole-Cole plot of AC impedance measurements" means a conventional curve is observed and at least one inflection point is observed.

Without being bound by theory, it is thought that the secondary storage phase is capable of reversibly charging and discharging hydrogen, as is the main (storage) phase, while the secondary catalytic phase "catalytic phase" acts to aid the main and/or storage phases in this reversible reaction.

It is believed the different phases are working together synergistically. It may be that one having a weaker metal-hydrogen bond will act as a catalyst while the other acts as a hydrogen storage phase. With facilitation from the catalytic phase, the hydrogen in the storage phase(s) may be more easily removed.

Simply mechanically mixing two different phases will not result in the present synergistic effect. The present alloys result in intimate contact of the different phases causing proximity in proton conduction; a Cole-cole plot of AC impedance measurement is one way to observe this synergism. Simple mechanical mixing will show a single semi-circle type curve with the combined R and C measurements as components in parallel connection, while a present alloy may exhibit two semi-circle type curves as in the case of measuring the AC impedance of a whole cell showing two semi-circles from positive and negative electrodes separately.

Instead of different phases acting in parallel connection, present alloys with an electrochemically active secondary phase may exhibit the active phases (main and active secondary) acting in series as observed in a Cole-Cole plot. When acting in series, a conventional curve is observed and at least one inflection point is observed.

The charge transfer resistance (R) at −40° C. of present alloys is for example ≤150, ≤140, ≤130, ≤120, ≤110, ≤100, ≤90, ≤80, ≤70, ≤60, ≤40, ≤30, ≤25, ≤20, ≤19, ≤18, ≤17, ≤16, ≤15, ≤14, ≤13, ≤12 or ≤11 Ω·g.

For instance the charge transfer resistance (R) at −40° C. of present alloys is from about 3 to about 50, from about 5 to about 20, about 7 to about 18, about 9 to about 16, from about 10 to about 15 or from about 11 to about 15 Ω·g.

Low temperature performance may also be determined at 10° C., 0° C., −10° C., −20° C. or at −30° C.; that is distinct representation of two active phases may also be observed at these temperatures.

For alloys with an electrochemically active secondary phase, charge transfer resistance is the sum of the resistance for the main phase(s) and the active secondary phase(s).

The charge transfer resistance (R) at −40° C. for the main phase or main phases of present alloys is for instance ≤150, ≤140, ≤130, ≤120, ≤110, ≤100, ≤90, ≤80, ≤70, ≤60, ≤40, ≤30, ≤25, ≤20, ≤19, ≤18, ≤17, ≤16, ≤15, 14, ≤13, ≤12 or ≤11≤10, ≤9, ≤8, ≤7, ≤6, ≤5 or ≤4 Ω·g. For example, (R) at −40° C. for a present main phase or main phases is from about 1 to about 30, from about 2 to about 20, from about 2 to about 15, from about 2 to about 10, from about 3 to about 9, from about 3 to about 8, from about 3 to about 7, from about 3 to about 6, from about 3 to about 5 or from about 3 to about 4 Ω·g.

The term "for the main phase or main phases" means for the main phases in total.

The surface catalytic ability at −40° C. of the main phase or main phases of present alloys is from about 1 to about 20, from about 1 to about 15, from about 1 to about 10, from about 1 to about 5, from about 1 to about 4, from about 1 to about 3 or from about 1.5 to about 2.5 seconds. For example, the surface catalytic ability at −40° C. of the main phase or phases is ≤30, ≤25, ≤20, ≤15, ≤12, ≤10, ≤9, ≤8, ≤7, ≤6, ≤5, ≤4, ≤3 or ≤2 seconds.

The present alloys for example exhibit an HRD of about 93%, about 94%, about 95%, about 96% or about 97% at the $3^{rd}$ cycle. For instance, the HRD at the $3^{rd}$ cycle is ≥93%, ≥94%, ≥95%, ≥96% or ≥97%.

The alloys contain at least one main phase and at least one secondary phase. The at least one main phase, the storage secondary phase and the catalytic secondary phase are each of different chemical composition and/or physical structure. Physical structures are crystalline and non-crystalline structures. Phase abundances may be determined by X-ray diffractometry (XRD). Phase compositions may be determined with a scanning electron microscope (SEM) equipped with energy dispersive spectroscopy (EDS).

The main phase or phases in total are present at a higher abundance by weight than each of the secondary phases. The main phase or phases are in general ABx phases, for instance $AB$, $AB_2$, $AB_3$, $A_2B_7$ or $AB_5$ phases.

Advantageously, the structure of each phase is different. That is, each phase has a structure selected from the group consisting of crystalline structures and non-crystalline (amorphous) structures and where each is different.

The present hydrogen storage alloys are for instance modified ABx type alloys where x is from about 0.5 to about 5.

The present alloys may comprise
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements.

Alternatively, the present alloys may comprise
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements.

For example, the present alloys are modified $AB_2$ type alloys; for example $AB_2$ type alloys where the atomic ratio of ii) to i) is from about 2.02 to about 2.45. For example, the ii) to i) atomic ratio is from about 2.04 to about 2.40, from about 2.10 to about 2.38, from about 2.20 to about 2.36 or from about 2.20 to about 2.36.

The present ii) to i) atomic ratio is for instance about 2.03, about 2.05, about 2.07, about 2.09, about 2.11, about 2.13, about 2.15, about 2.17, about 2.19, about 2.21, about 2.23, about 2.25, about 2.27, about 2.29, about 2.31, about 2.33, about 2.35, about 2.37 or about 2.39.

Present modified $AB_2$ type alloys contain for example C14 or C15 main Laves phases or contain C14 and C15 main Laves phases. The C14 phase abundance is for instance from about 70 to about 95 wt %, for instance from about 80 to about 90 wt % or from about 83 to 89 wt %, based on the alloy. The C15 phase abundance is for instance from about 2 to about 20 wt %, from about 3 to about 17 wt % or from about 3 to 16 wt %, based on the alloy.

The present alloys contain for instance C14 or C15 Laves phases or contain C14 and C15 main Laves phases and where the storage secondary phase and catalytic secondary phase are non-Laves phases.

The catalytic secondary phase abundance is for instance from about 0.3 to about 15 wt %, from about 0.5 to about 10 wt %, for instance from about 0.7 to about 5 wt %, based on the alloy. The catalytic secondary phase abundance may be about 0.1 wt %, about 0.4, about 0.9, about 1.1, about 1.3, about 1.5, about 1.7, about 2.0, about 2.5, about 3.0, about 3.5 or about 4.0 wt %, based on the alloy.

The storage secondary phase abundance is for example from about 0.51 to about 15 wt %, from about 0.52 to about 12 wt %, from about 0.55 to about 11 wt %, from about 0.6 to about 9 wt %, from about 0.7 to about 7 wt %, from about 0.9 to about 5 wt % or from about 1.0 to about 3 wt %, based on the alloy.

The storage secondary phase abundance is for instance about 0.6 wt %, about 0.9, about 1.2, about 1.5, about 1.7, about 1.9, about 2.1, about 2.3, about 2.5, about 2.7 or about 2.9 wt %, based on the alloy.

Advantageously, the alloys comprise from about 0.1 to about 4.0, from about 0.2 to about 3.5 or from about 0.3 to about 3.3 wt % of a catalytic secondary phase comprising Ti and Ni and from about 0.1 to about 4.0, from about 0.2 to about 3.5 or from about 0.3 to about 3.3 wt % of a storage secondary phase comprising La and Ni, based on the total alloy.

In general, within a series of alloys of similar composition, as the weight ratio of the catalytic secondary phase abundance to the storage secondary phase abundance decreases, the low temperature electrochemical performance increases. The weight ratio of the catalytic secondary phase abundance to the storage secondary phase abundance is advantageously from about 5 to about 0.1, from about 4 to about 0.1, from about 3 to about 0.1, from about 2 to about 0.1 or from about 1 to about 0.1. The weight ratio of the catalytic secondary phase abundance to the storage secondary phase abundance is for instance about 0.2, about 0.3, about 0.4, about 0.5, about 0.6, about 0.7, about 0.8, about 0.9, about 1.1, about 1.3, about 1.5, about 1.7 or about 1.9 and levels in between.

For instance, the weight ratio of the catalytic secondary phase abundance to the storage secondary phase abundance is <3.0, ≤2.5, ≤2.0, ≤1.5, ≤1.0 or ≤0.5.

The catalytic secondary phase advantageously has a TiNi (B2) crystal structure. That is, the crystal structure of the catalytic secondary phase advantageously is the known TiNi (B2) crystal structure as determined by X-ray diffractometry (XRD). To have the known TiNi (B2) crystal structure, the catalytic secondary phase need not contain Ti and/or Ni.

The catalytic secondary phase may comprise Ti and/or Ni.

The catalytic secondary phase for instance contains one or more elements selected from the group consisting of Ti, Zr, Nb and Hf and also comprises Ni. The catalytic secondary phase for instance comprises Ti and Ni or comprises Ti, Zr and Ni.

The catalytic secondary phase comprises for instance from about 13 to about 45 at % Ti, from about 15 to about 30 at % Ti or from about 20 to about 30 at % Ti.

The catalytic secondary phase comprises for instance from about 5 to about 30 at % Zr, from about 7 to about 25 at % Zr or from about 10 to about 22 at % Zr.

The catalytic secondary phase comprises for instance from about 38 to about 60 at % Ni, from about 40 to about 55 at % Ni or from about 42 to about 47 at % Ni.

The crystal structures of the present catalytic secondary phases containing the above levels of Ti and Ni are the known Ti (B2) crystal structure, although they may contain significant amounts of other metals such as Zr which is soluble in the TiNi phase.

For example the catalytic secondary phase contains from about 42 to about 47 at % Ni, from about 20 to about 29 at % Ti and from about 12 to about 22 at % Zr where (Ti+Zr) is from about 39 to about 43 at %. Advantageously, the at % of Zr is ≤the at % of Ti when present together in a catalytic secondary phase. For instance the at % of Zr is <the at % of Ti when present together in a catalytic secondary phase.

The storage secondary phase for instance has a structure different from that of the catalytic secondary phase.

The storage secondary phase comprises one or more rare earth elements. The storage secondary phase for instance comprises Ni, comprises one or more rare earth elements and Ni or comprises La and Ni.

For example, the storage secondary phase comprises from about 30 to about 60 at %, from about 40 to about 55 at %, from about 41 to about 52 at % or from about 44 to about 50 at % one or more rare earth elements. The rare earth element is for instance La.

The storage secondary phase for instance comprises from about 30 to about 60 at %, from about 40 to about 55 at %, from about 42 to about 52 or from about 45 to about 50 at % Ni.

For example, the storage secondary phase contains from about 41 to about 51 at % La and from about 44 to about 50 at % Ni or from about 48 to about 50 at % La and from about 49 to about 50 at % Ni.

Atomic percents (at %) discussed herein regarding individual phases means based on the phase.

Atomic percents (at %) discussed herein regarding the alloy means based on the total alloy.

Rare earth elements are Sc, Y, La and the Lanthanides. Mischmetal is included with the term "one or more rare earth elements". The rare earth element is for instance La.

The present alloys contain for instance from about 0.1 at % to about 10.0 at % one or more rare earth elements, from about 0.7 to about 8.0 at %, from about 1.0 to about 7.0 at %, from about 1.5 to about 6.0 at % or from about 2.0 to about 5.5 at % one or more rare earth elements. The present alloys contain for instance about 1.5, about 2.0, about 2.5, about 3.0, about 3.5, about 4.0, about 4.5, about 5.0, about 5.5, about 6.0, about 6.5, about 7.0, about 7.5 or about 8.0 at % one or more rare earth elements and levels in between.

The present alloys contain for example Ti, Zr, V, Ni, one or more rare earth elements and one or more elements selected from the group consisting of Cr, Mn and Al. The alloys for instance contain Ti, Zr, V, Ni, Cr, Mn, Al, Co and one or more rare earth elements. For example, the alloys contain Ti, Zr, V, Ni, Cr, Mn, Al, Co and La.

For instance, the present alloys comprise about 0.1 to about 60% Ti, about 0.1 to about 40% Zr, 0<V<60%, 0 to about 56% Cr, about 5 to about 22% Mn, about 0.1 to about 57% Ni, 0 to about 3% Sn, about 0.1 to about 10% Al, about 0.1 to about 11% Co and about 0.1 to about 10% one or more rare earth elements, where the percents are atomic % and in total equal 100%.

Also disclosed are alloys comprising about 5 to about 15% Ti, about 18 to about 29% Zr, about 3.0 to about 13% V, about 1 to about 10% Cr, about 6 to about 18% Mn, about 29 to about 41% Ni, about 0.1 to about 0.7% Al, about 2 to about 11% Co and about 0.7 to about 8% one or more rare earth elements, where the percents are atomic % and in total equal 100%.

Advantageously, the alloys comprise about 11% to about 13% Ti, about 21 to about 23% Zr, about 9 to about 11% V, about 6 to about 9% Cr, about 6 to about 9% Mn, about 31 to about 34% Ni, about 0.3 to about 0.6% Al, about 2 to about 8% Co and about 1 to about 7% one or more rare earth elements, where the percents are atomic % and in total equal 100%.

The present alloys in general comprise a bulk region and a surface region. The surface region is at or near the surface and is also known as a surface layer, interface layer, interface region, etc. The surface or interface region constitutes an interface between the electrolyte and the bulk portion of a hydrogen storage alloy.

Surface oxides are often present in the surface region of hydrogen storage alloys after their fabrication. Surface oxides are typically insulating and thereby generally inhibit the performance of electrodes utilizing the alloys.

The present alloys may comprise a metal oxide with a high degree of oxidation. For instance, the metal oxide contains ≥60 at % oxygen, ≥62 at % oxygen, ≥64 at % oxygen, ≥66 at % oxygen or ≥68 at % oxygen, based on the total elements of the metal oxide.

Present metal oxides refer in general to oxidized metals and include for instance metal oxides and hydroxides.

The present alloys may contain a metal oxide which contains ≥60 at % oxygen and/or they may contain a metal region adjacent to a boundary region which comprises at least one channel and/or they may comprise a metal region adjacent to a boundary region which is from about 12 nm to about 1100 nm wide on average and/or they may comprise a metal oxide zone aligned with at least one channel.

The present metal oxide with a high degree of oxidation resides in a "metal oxide zone". The metal oxide zone comprises the present metal oxide; or the metal oxide zone may consist essentially or consist of the present metal oxide.

The present metal oxide contains for instance ≥60 at % oxygen, ≥62 at % oxygen, ≥64 at % oxygen, ≥66 at % oxygen or ≥68 at % oxygen or contains from about 60 at % to about 82 at % oxygen, from about 63 to about 77 at % oxygen, from about 64 at % to about 75 at % oxygen, from about 65 at % to about 72 at % oxygen or from about 66 at % to about 70 at % oxygen.

The metal oxide contains for example about 60 at %, about 61, about 62, about 63, about 64, about 65, about 66, about 67, about 68, about 69, about 70, about 71, about 72, about 73, about 74, about 75, about 76, about 77, about 78, about 79, about 80, about 81 or about 82 at % oxygen, based on the metal oxide.

Amounts of elements discussed for the oxide are based on the metal oxide.

The metal oxide may comprise Ni and/or Cr. The metal oxide may be a Ni/Cr oxide. Ni/Cr alloy is difficult to oxidize, therefore formation of Ni/Cr oxides is unusual. For example, the metal oxide is a Ni/Cr oxide that contains from about 64 at % to about 71 at % oxygen, from about 3 at % to about 8 at % Cr and from about 16 at % to about 21 at % Ni. The Ni/Cr oxides may comprise Ni(Cr)OOH and/or Ni(Cr)(OH)$_2$.

The Ni/Cr oxide may contain Ni and Cr where each are present in a higher atomic percentage than any of each other metal (or metalloid); for example as in the present working example. Metalloids such as B and Si are included with metals for this definition.

The metal oxide contains for instance ≥2 at % Cr, ≥3 at % Cr, ≥4 at % Cr or ≥5 at % Cr or contains from about 2 at % to about 8 at % Cr, from about 3 at % to about 8 at % Cr or from about 4 at % to about 7 at % Cr. The metal oxide contains for instance about 2 at %, about 3, about 4, about 5, about 6, about 7 or about 8 at % Cr.

The metal oxide contains for example ≥16 at % Ni, ≥17 at % Ni, ≥18 at % Ni or ≥19 at % Ni or contains from about 16 at % to about 23 at % Ni, from about 17 at % to about 22 at % Ni or from about 18 to about 21 at % Ni. The metal oxide contains for instance about 16 at %, about 17, about 18, about 19, about 20, about 21, about 22 or about 23 at % Ni.

The metal oxide may contain one or more elements selected from the group consisting of B, Al, Si, Sn and transition metals, for example one or more elements selected from the group consisting of Al, Ti, V, Mn, Co and Zr. These one or more elements may be present in the oxide in total from about 1 at % to about 17 at %, from about 2 at % to about 14 at %, from about 3 at % to about 12 at %, from about 3 at % to about 10 at % or from about 4 at % to about 9 at %.

The metal oxide may reside in a boundary region adjacent to a metal region, which boundary region may comprise at least one channel. For instance, the boundary region separates metal regions. The boundary region for example has a length and an average width and comprises at least one channel which runs lengthwise (along the length) of the boundary region. The channel may have an average width of from about 4 nm to about 40 nm, from about 5 nm to about 35 nm, from about 7 nm to about 30 nm or from about 8 nm to about 25 nm. Thus, the boundary region is also named a "metal oxide boundary region".

The channel may provide direct access of an electrolyte to a bulk alloy. The channel is unoccupied, open and non-dense. The "metal regions" are the bulk alloy or "bulk metal regions". It is believed the channels are capable of allowing transport of electrolyte to a bulk metal region, thus providing outstanding electrochemical performance.

The boundary region may comprise a transition oxide zone adjacent to a metal region, which transition zone may run along the length of the boundary region. The transition oxide zone has an average width for instance of from about 4 nm to about 30 nm, from about 5 nm to about 25 nm, from about 7 nm to about 20 nm or from about 8 nm to about 17 nm.

The transition oxide resides in a transition oxide zone. The transition oxide is a metal oxide of a similar composition to the present highly oxidized metal oxide but is somewhat less oxidized. For instance, the transition oxide contains <60 at % oxygen or <55 at % oxygen, based on the transition oxide.

The boundary region may comprise a metal oxide zone, which may run along the length of the boundary region and which for example has an average width of from about 5 nm to about 500 nm, from about 6 nm to about 400 nm, from about 7 nm to about 300 nm, from about 8 nm to about 200 nm or from about 8 nm to about 100 nm.

The boundary region for instance has a length and an average width and comprises across the width a first transition oxide zone, a metal oxide zone and a second transition oxide zone, each running along the length of the boundary region; or comprises across the width a first transition oxide zone, a channel and a second transition oxide zone, each running along the length of the boundary region; or comprises across the width a first transition oxide zone, a metal oxide zone, a channel and a second transition oxide zone, each running along the length of the boundary region; or comprises across the width a first transition oxide zone, a first metal oxide zone, a channel, a second metal oxide zone and a second transition oxide zone, each running along the length of the boundary region.

The term "running along the length" means aligned with. The boundary region is for instance a narrow linear and/or curved "path" structure comprising the structures selected from transition oxide zones, metal oxide zones and channels. The transition oxide zones, metal oxide zones and channels for instance are each aligned with the boundary region and each other; in other words parallel to each other along their path.

The boundary region is adjacent to a metal region and/or separates metal regions. The metal regions are the bulk metal alloy.

The boundary region may be nano-scaled, for example the boundary region may have an average width of from about 12 nm to about 1100 nm from about 17 to about 1000 nm, from about 20 nm to about 1000 nm, from about 20 nm to about 900 nm, from about 20 nm to about 800 nm, from about 20 nm to about 700 nm, from about 17 nm to about 600 nm, from about 20 nm to about 500 nm, from about 25 nm to about 400 nm, from about 30 nm to about 300 nm, from about 35 nm to about 200 nm or from about 40 nm to about 100 nm. The boundary region for instance has a length and an average width, where the length is ≥4 times, ≥8 times, ≥12 times, ≥16 times, ≥20 times or ≥24 times the average width. For example, the boundary region has a length and an average width, where the length is ≥4 times, ≥8 times, ≥12 times, ≥16 times, ≥20 times or ≥24 times the average width and where the width is substantially uniform along the length.

Without being bound by theory, it is thought that the present modifying elements and/or processes affect the structure and composition of the metal oxides and boundary region.

The present alloys, in general containing a bulk metal alloy region and a surface oxide region, advantageously also contain open channels within and/or throughout the bulk region.

The channels may be interconnected and form a three dimensional network. The channels may be aligned with a present metal oxide zone and/or a transition oxide zone. The channels may extend through the surface oxide region. It may be that electrolyte can "flow" through the open channels and thereby gain greater access to the bulk alloy. Another way to describe the present alloys containing channels is that they have a much greater surface area than prior alloys, the open channels constituting a surface of the alloy.

This "surface oxide" is a conventional metal oxide/hydroxide. Present alloys may or may not contain a conventional surface oxide in addition to present highly oxidized metal oxide.

For instance, present alloys may have a BET (Brunauer-Emmett-Teller) surface area of ≥3.0 $m^2/g$, ≥3.2 $m^2/g$, ≥3.4 $m^2/g$, ≥3.6 $m^2/g$, ≥3.8 $m^2/g$, ≥4.0 $m^2/g$, ≥4.2 $m^2/g$, ≥4.4 $m^2/g$, ≥4.6 $m^2/g$ or ≥4.8 $m^2/g$. BET surface area is measured by the liquid nitrogen dipping BET method.

The present alloys have a functionally high surface area. This high surface area is not entirely detectable via conventional BET measurements as the narrow channels are too long for liquid nitrogen to penetrate. The functional surface area may be measured via capacitance. Thus, alloy 5 of the working Examples will have a much higher surface area than alloy 0.

The highly oxidized Ni/Cr oxide in the narrow boundary region is highly oriented and is for instance crystalline. The present alloys may also contain a larger (wide) boundary region containing a randomly oriented, very dense metal oxide, which may also be high in Cr and Ni. Thus, the present alloys may contain a narrow boundary region containing a crystalline Ni/Cr metal oxide and a wide boundary region containing a random Ni/Cr metal oxide.

The present alloys are capable of reversibly absorbing and desorbing hydrogen.

Further subject of the present invention is a metal hydride battery comprising at least one anode capable of reversibly charging and discharging hydrogen, at least one cathode capable of reversible oxidation, a casing having said anode and cathode positioned therein, a separator separating the cathode and the anode and an electrolyte in contact with both the anode and the cathode, where the anode comprises a present hydrogen storage alloy.

The present battery is capable of charging a large amount of hydrogen under one polarity and for discharging a desired amount of hydrogen under the opposite polarity.

Also subject of the invention is an alkaline fuel cell comprising at least one hydrogen electrode, at least one oxygen electrode and at least one gas diffusion material, where the hydrogen electrode comprises a present hydrogen storage alloy.

Also subject of the invention is a metal hydride air battery comprising at least one air permeable cathode, at least one anode, at least one air inlet and an electrolyte in contact with both the anode and the cathode, where the anode comprises a present hydrogen storage alloy.

The U.S. patent applications, published U.S. patent applications and U.S. patents discussed herein are hereby incorporated by reference.

The term "a" referring to elements of an embodiment may mean "one" or "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture.

Whether or not modified by the term "about," embodiments and embodiments include equivalents to the recited quantities.

All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure.

A value modified by the term "about" of course includes the specific value. For instance, "about 5.0" must include 5.0.

Following are some embodiments of the invention.

E1. A hydrogen storage alloy, for example a hydrogen storage alloy having improved low temperature electrochemical properties, comprising a metal oxide containing ≥60 at % oxygen, based on the metal oxide; for example where the alloy exhibits a charge transfer resistance (R) at −40° C. of ≤50% of that of the alloy not containing said oxide; for example where the alloy exhibits a charge transfer resistance at −40° C. of ≤60%, ≤40%, ≤30%, ≤20% or ≤10% of that of the alloy not containing said oxide.

E2. An alloy according to the first embodiment, where the metal oxide contains ≥62 at % oxygen, ≥64 at % oxygen, ≥66 at % oxygen or ≥68 at % oxygen; or contains from about 60 at % to about 82 at % oxygen, from about 63 to about 77 at % oxygen, from about 64 at % to about 75 at % oxygen, from about 65 at % to about 72 at % oxygen or from about 66 at % to about 70 at % oxygen; or contains about 60 at %, about 61, about 62, about 63, about 64, about 65, about 66, about 67, about 68, about 69, about 70, about 71, about 72, about 73, about 74, about 75, about 76, about 77, about 78, about 79, about 80, about 81 or about 82 at % oxygen, based on the metal oxide.

E3. An alloy according to any of the preceding embodiments where the metal oxide contains ≥2 at % Cr, ≥3 at % Cr, ≥4 at % Cr or ≥5 at % Cr; or contains from about 2 at % to about 8 at % Cr, from about 3 at % to about 8 at % Cr or from about 4 at % to about 7 at % Cr; or about 2 at %, about 3, about 4, about 5, about 6, about 7 or about 8 at % Cr, based on the metal oxide.

E4. An alloy according to any of the preceding embodiments where the metal oxide contains from about 2 at % to about 8 at % Cr, based on the metal oxide.

E5. An alloy according to any of the preceding embodiments where the metal oxide contains ≥16 at % Ni, ≥17 at % Ni, ≥18 at % Ni or ≥19 at % Ni; or contains from about 16 at % to about 23 at % Ni, from about 17 at % to about 22 at % Ni or from about 18 to about 21 at % Ni; or about 16 at %, about 17, about 18, about 19, about 20, about 21, about 22 or about 23 at % Ni, based on the metal oxide.

E6. An alloy according to any of the preceding embodiments where the metal oxide contains from about 16 at % to about 23 at % Ni, based on the metal oxide.

E7. An alloy according to any of the preceding embodiments where the metal oxide contains from about 64 at % to about 71 at % oxygen, from about 3 at % to about 8 at % Cr and from about 16 at % to about 21 at % Ni, based on the metal oxide.

E8. An alloy according to any of the preceding embodiments where the metal oxide contains one or more elements selected from the group consisting of B, Al, Si, Sn and transition metals.

E9. An alloy according to any of the preceding embodiments where the metal oxide contains one or more elements selected from the group consisting of Al, Ti, V, Mn, Co and Zr.

E10. An alloy according to any of the preceding embodiments where the metal oxide contains one or more elements selected from the group consisting of B, Si, Sn, Al, Ti, V, Mn, Co and Zr in total from about 1 at % to about 17 at %, from about 2 at % to about 14 at %, from about 3 at % to about 12 at %, from about 3 at % to about 10 at % or from about 4 at % to about 9 at %, based on the metal oxide.

E11. An alloy according to any of the preceding embodiments where the metal oxide resides in a boundary region adjacent to a metal region or in a boundary region which separates metal regions.

E12. An alloy according to any of the preceding embodiments where the boundary region has a length and an average width and comprises at least one channel which runs lengthwise in the boundary region.

E13. An alloy according to embodiments 11 or 12, where the boundary region comprises at least one channel having an average width of from about 4 nm to about 40 nm, from about 5 nm to about 35 nm, from about 7 nm to about 30 nm or from about 8 nm to about 25 nm.

E14. An alloy according to any of embodiments 11-13, where the boundary region has a length and an average width and comprises a transition oxide zone adjacent to a metal region which transition zone runs lengthwise in the boundary region.

E15. An alloy according to any of embodiments 11-14, where the boundary region comprises a transition oxide zone adjacent to a metal region which transition oxide zone has an average width of from about 4 nm to about 30 nm, from about 5 nm to about 25 nm, from about 7 nm to about 20 nm or from about 8 nm to about 17 nm.

E16. An alloy according to any of embodiments 11-15 where the boundary region has a length and an average width and comprises a metal oxide zone which runs lengthwise in the boundary region.

E17. An alloy according to any of embodiments 11-16, where the boundary region comprises a metal oxide zone having an average width of from about 5 nm to about 500 nm, from about 6 nm to about 400 nm, from about 7 nm to about 300 nm, from about 8 nm to about 200 nm or from about 8 nm to about 100 nm.

E18. An alloy according to any of embodiments 11-17, where the boundary region has a length and an average width and comprises across the width a first transition oxide zone, a metal oxide zone and a second transition oxide zone, each aligned with the others.

E19. An alloy according to any of embodiments 11-18, where the boundary region has a length and an average width and comprises across the width a first transition oxide zone, a channel and a second transition oxide zone, each aligned with the others.

E20. An alloy according to any of embodiments 11-19, where the boundary region has a length and an average width and comprises across the width a first transition oxide zone, a metal oxide zone, a channel and a second transition oxide zone, each aligned with the others.

E21. An alloy according to any of embodiments 11-20, where the boundary region has a length and an average width, where the length is ≥4 times, ≥8 times, ≥12 times, ≥16 times, ≥20 times or ≥24 times the average width; or the boundary region has a length and an average width, where the length is ≥4 times, ≥8 times, ≥12 times, ≥16 times, ≥20 times or ≥24 times the average width and where the width is substantially uniform along the length.

E22. An alloy according to any of embodiments 11-21, where the boundary region has an average width of from about 12 nm to about 1100 nm, from about 17 to about 1000 nm, from about 20 nm to about 1000 nm, from about 20 nm to about 900 nm, from about 20 nm to about 800 nm, from about 20 nm to about 700 nm, from about 17 nm to about 600 nm, from about 20 nm to about 500 nm, from about 25 nm to about 400 nm, from about 30 nm to about 300 nm, from about 35 nm to about 200 nm or from about 40 nm to about 100 nm.

E23. An alloy according to any of the preceding embodiments comprising from about 0.1 at % to about 10.0 at % one or more rare earth elements, from about 0.7 to about 8.0 at %, from about 1.0 to about 7.0 at %, from about 1.5 to about 6.0 at % or from about 2.0 to about 5.5 at % one or more rare earth elements; or about 1.5, about 2.0, about 2.5, about 3.0, about 3.5, about 4.0, about 4.5, about 5.0, about 5.5, about 6.0, about 6.5, about 7.0, about 7.5 or about 8.0 at % one or more rare earth elements and levels in between.

E24. An alloy according to any of the preceding embodiments which comprises at least one main phase and at least one secondary phase.

E25. A alloy according to any of the preceding embodiments which comprises at least one main phase and a secondary phase, which secondary phase comprises one or more rare earth elements.

E26. An alloy according to any of the preceding embodiments comprising at least one main phase and a secondary phase, where the secondary phase comprises Ni.

E27. An alloy according to any of the preceding embodiments comprising
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements; for example where the atomic ratio of ii) to i) is from about 2.02 to about 2.45. For example, the ii) to i) atomic ratio is from about 2.04 to about 2.40, from about 2.10 to about 2.38, from about 2.20 to about 2.36 or from about 2.20 to about 2.36.

E28. An alloy according to any of the preceding embodiments comprising a C14 or C15 main Laves phase or comprising C14 and C15 main Laves phases.

E29. An alloy according to any of the preceding embodiments comprising
a C14 or C15 main Laves phase or C14 and C15 main Laves phases,
>0.5 wt % of an electrochemically active storage secondary phase comprising La and Ni and
  from about 0.3 wt % to about 15 wt % of a catalytic secondary phase comprising Ti and Ni.

E30. An alloy according to any of the preceding embodiments comprising
Ti, Zr, V, Ni, Cr and one or more rare earth elements; or
Ti, Zr, Ni, Mn, Cr and one or more rare earth elements; or
Ti, Cr, V, Ni and one or more rare earth elements; or
Ti, Zr, V, Ni, Cr and one or more elements selected from the group consisting of B, Al, Si, Sn and other transition metals; or
Ti, Zr, V, Ni, Cr, one or more rare earth elements and one or more elements selected from the group consisting of Mn, Sn, Al, Cu, Mo, W, Fe, Si and Co; or
Ti, Zr, V, Ni, Cr, one or more rare earth elements and one or more elements selected from the group consisting of Mn and Al; or
Ti, Zr, V, Ni, Cr, Mn, Al, Co and one or more rare earth elements; or
Ti, Zr, V, Ni, Cr, Mn, Al, Co and La.

E31. An alloy according to any of the preceding embodiments comprising
about 0.1 to about 60% Ti, about 0.1 to about 40% Zr, 0<V<60%, about 1% to about 56% Cr, about 5 to about 22% Mn, about 0.1 to about 57% Ni, 0 to about 3% Sn, about 0.1 to about 10% Al, about 0.1 to about 11% Co and about 0.1 to about 10% one or more rare earth elements; or
about 5 to about 15% Ti, about 18 to about 29% Zr, about 3.0 to about 13% V, about 1 to about 10% Cr, about 6 to about 18% Mn, about 29 to about 41% Ni, about 0.1 to about 0.7% Al, about 2 to about 11% Co and about 0.7 to about 8% one or more rare earth elements; or
about 11% to about 13% Ti, about 21 to about 23% Zr, about 9 to about 11% V, about 6 to about 9% Cr, about 6 to about 9% Mn, about 31 to about 34% Ni, about 0.3 to about 0.6% Al, about 2 to about 8% Co and about 1 to about 7% one or more rare earth elements,
where the percents are atomic % and in total equal 100%.

E32. An alloy according to any of the preceding embodiments, where the metal oxide is a Ni and/or Cr metal oxide, for example a Ni/Cr oxide.

E33. An alloy according to any of the preceding embodiments which exhibits an high rate dischargeability of about 93%, about 94%, about 95%, about 96% or about 97% at the $3^{rd}$ cycle; or ≥93%, ≥94%, ≥95%, ≥96% or ≥97% at the $3^{rd}$ cycle, defined as the ratio of discharge capacity measured at 50 mA $g^{-1}$ to that measured at 4 mA $g^{-1}$, measured in a flooded cell configuration against a partially pre-charged $Ni(OH)_2$ positive electrode with no alkaline pretreatment applied before the half-cell measurement and where each sample electrode is charged at a constant current density of 50 mA $g^{-1}$ for 10 h and then discharged at a current density of 50 mA $g^{-1}$ followed by two pulls at 12 and 4 mA $g^{-1}$; and/or
exhibits a charge transfer resistance (R) at −40° C. for the main phase or main phases of ≤10, ≤9, ≤8, ≤7, ≤6, ≤5 or ≤4 Ω·g; or from about 2 to about 10, from about 3 to about 9, from about 3 to about 8, from about 3 to about 7, from about 3 to about 6, from about 3 to about 5 or from about 3 to about 4 Ω·g; and/or
exhibits a charge transfer resistance (R) at −40° C. of from about 5 to about 20, about 7 to about 18, about 9 to about 16, from about 10 to about 15 or from about 11 to about 15 Ω·g; and/or
exhibits a surface catalytic ability at −40° C. of the main phase or main phases of from about 1 to about 5, from about 1 to about 4, from about 1 to about 3 or from about 1.5 to about 2.5 seconds; or ≤4, ≤3 or ≤2 seconds.

Following are another set of embodiments.

E1. A hydrogen storage alloy, for example a hydrogen storage alloy having improved low temperature electrochemical properties, comprising a bulk metal region adjacent to a metal oxide boundary region, for example comprising bulk metal regions separated by a metal oxide boundary region, which boundary region comprises at least one channel; for instance where the channel is capable of allowing transport of electrolyte to a bulk metal region.

E2. A hydrogen storage alloy according to embodiment 1, where the boundary region comprises a metal oxide, for instance a Ni and/or Cr metal oxide, for example a Ni/Cr metal oxide.

E3. An alloy according to embodiment 2 which contains ≥60 at % oxygen, ≥62 at % oxygen, ≥64 at % oxygen, ≥66 at % oxygen or ≥68 at % oxygen; or contains from about 60 at % to about 82 at % oxygen, from about 63 to about 77 at % oxygen, from about 64 at % to about 75 at % oxygen, from about 65 at % to about 72 at % oxygen or from about 66 at % to about 70 at % oxygen; or contains about 60 at %, about 61, about 62, about 63, about 64, about 65, about 66, about 67, about 68, about 69, about 70, about 71, about 72, about 73, about 74, about 75, about 76, about 77, about 78, about 79, about 80, about 81 or about 82 at % oxygen, based on the metal oxide.

E4. An alloy according to embodiments 2 or 3 where the metal oxide contains ≥2 at % Cr, ≥3 at % Cr, ≥4 at % Cr or ≥5 at % Cr; or contains from about 2 at % to about 8 at % Cr, from about 3 at % to about 8 at % Cr or from about 4 at % to about 7 at % Cr; or about 2 at %, about 3, about 4, about 5, about 6, about 7 or about 8 at % Cr, based on the metal oxide.

E5. An alloy according to any of embodiments 2-4 where the metal oxide contains ≥16 at % Ni, ≥17 at % Ni, ≥18 at % Ni or ≥19 at % Ni; or contains from about 16 at % to about 23 at % Ni, from about 17 at % to about 22 at % Ni or from about 18 to about 21 at % Ni; or about 16 at %, about 17, about 18, about 19, about 20, about 21, about 22 or about 23 at % Ni, based on the metal oxide.

E6. An alloy according to any of embodiments 2-5 where the metal oxide contains from about 64 at % to about 71 at % oxygen, from about 3 at % to about 8 at % Cr and from about 16 at % to about 21 at % Ni, based on the metal oxide.

E7. An alloy according to any of embodiments 2-6 where the metal oxide contains oxygen, Ni, Cr and one or more elements selected from the group consisting of Al, Ti, V, Mn, Co and Zr, based on the metal oxide.

E8. An alloy according to any of the preceding embodiments where the boundary region has a length and an average width and comprises at least one channel which runs along the length of the boundary region.

E9. An alloy according to any of the preceding embodiments where the boundary region comprises at least one channel having an average width of from about 4 nm to about 40 nm, from about 5 nm to about 35 nm, from about 7 nm to about 30 nm or from about 8 nm to about 25 nm.

E10. An alloy according to any of the preceding embodiments where the boundary region has a length and an average width and further comprises a transition oxide zone adjacent to a metal region which transition zone runs along the length of the boundary region.

E11. An alloy according to embodiment 10 where the transition oxide zone has an average width of from about 4 nm to about 30 nm, from about 5 nm to about 25 nm, from about 7 nm to about 20 nm or from about 8 nm to about 17 nm.

E12. An alloy according to any of the preceding embodiments where the boundary region has a length and an average width and comprises a metal oxide zone which runs along the length of the boundary region.

E13. An alloy according to embodiment 12 where the metal oxide zone has an average width of from about 5 nm to about 500 nm, from about 6 nm to about 400 nm, from about 7 nm to about 300 nm, from about 8 nm to about 200 nm or from about 8 nm to about 100 nm.

E14. An alloy according to any of the preceding embodiments where the boundary region has a length and an average width and comprises across the width a first transition oxide zone, a metal oxide zone and a second transition oxide zone, each running along the length of the boundary region; or comprises across the width a first transition oxide zone, a metal oxide zone and a second transition oxide zone, each aligned with the others.

E15. An alloy according to any of the preceding embodiments where the boundary region has a length and an average width and comprises across the width a first transition oxide zone, a channel and a second transition oxide zone, each running along the length of the boundary region; or comprises across the width a first transition oxide zone, a channel and a second transition oxide zone each aligned with the others.

E16. An alloy according to any of the preceding embodiments where the boundary region has a length and an average width and comprises across the width a first transition oxide zone, a metal oxide zone, a channel and a second transition oxide zone, each running along the length of the boundary region; or comprises across the width a first transition oxide zone, a metal oxide zone, a channel and a second transition oxide zone, each aligned with the others.

E17. An alloy according to any of the preceding embodiments where the boundary region has a length and an average width, where the length is ≥4 times, ≥8 times, ≥12 times, ≥16 times, ≥20 times or ≥24 times the average width; or the boundary region has a length and an average width, where the length is ≥4 times, ≥8 times, ≥12 times, ≥16 times, ≥20 times or ≥24 times the average width and where the width is substantially uniform along the length.

E18. An alloy according to any of the preceding embodiments where the boundary region has an average width of from about 12 nm to about 1100 nm, from about 17 to about 1000 nm, from about 20 nm to about 1000 nm, from about 20 nm to about 900 nm, from about 20 nm to about 800 nm, from about 20 nm to about 700 nm, from about 17 nm to about 600 nm, from about 20 nm to about 500 nm, from about 25 nm to about 400 nm, from about 30 nm to about 300 nm, from about 35 nm to about 200 nm or from about 40 nm to about 100 nm.

E19. An alloy according to any of the preceding embodiments comprising from about 0.1 at % to about 10.0 at % one or more rare earth elements, from about 0.7 to about 8.0 at %, from about 1.0 to about 7.0 at %, from about 1.5 to about 6.0 at % or from about 2.0 to about 5.5 at % one or more rare earth elements; or about 1.5, about 2.0, about 2.5, about 3.0, about 3.5, about 4.0, about 4.5, about 5.0, about 5.5, about 6.0, about 6.5, about 7.0, about 7.5 or about 8.0 at % one or more rare earth elements and levels in between.

E20. An alloy according to any of the preceding embodiments which comprises at least one main phase and at least one secondary phase.

E21. A alloy according to any of the preceding embodiments which comprises at least one main phase and a secondary phase, which secondary phase comprises one or more rare earth elements.

E22. An alloy according to any of the preceding embodiments comprising at least one main phase and a secondary phase, where the secondary phase comprises Ni.

E23. An alloy according to any of the preceding embodiments comprising at least one main phase and a secondary phase, where the secondary phase comprises La and Ni.

E24. An alloy according to any of the preceding embodiments comprising
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements,
for example where the atomic ratio of ii) to i) is from about 2.02 to about 2.45. For example, the ii) to i) atomic ratio is from about 2.04 to about 2.40, from about 2.10 to about 2.38, from about 2.20 to about 2.36 or from about 2.20 to about 2.36.

E25. An alloy according to any of the preceding embodiments comprising a C14 or C15 main Laves phase or comprising C14 and C15 main Laves phases.

E26. An alloy according to any of the preceding embodiments comprising
a C14 or C15 main Laves phase or C14 and C15 main Laves phases,
>0.5 wt % of an electrochemically active storage secondary phase comprising La and Ni and from about 0.3 wt % to about 15 wt % of a catalytic secondary phase comprising Ti and Ni.

E27. An alloy according to any of the preceding embodiments comprising
Ti, Zr, V, Ni, Cr and one or more rare earth elements; or
Ti, Zr, Ni, Mn, Cr and one or more rare earth elements; or
Ti, Cr, V, Ni and one or more rare earth elements; or
Ti, Zr, V, Ni, Cr and one or more elements selected from the group consisting of B, Al, Si, Sn and other transition metals; or
Ti, Zr, V, Ni, Cr, one or more rare earth elements and one or more elements selected from the group consisting of Mn, Sn, Al, Cu, Mo, W, Fe, Si and Co; or
Ti, Zr, V, Ni, Cr, one or more rare earth elements and one or more elements selected from the group consisting of Mn and Al; or
Ti, Zr, V, Ni, Cr, Mn, Al, Co and one or more rare earth elements; or
Ti, Zr, V, Ni, Cr, Mn, Al, Co and La.

E28. An alloy according to any of the preceding embodiments comprising
about 0.1 to about 60% Ti, about 0.1 to about 40% Zr, 0<V<60%, about 1% to about 56% Cr, about 5 to about 22% Mn, about 0.1 to about 57% Ni, 0 to about 3% Sn, about 0.1 to about 10% Al, about 0.1 to about 11% Co and about 0.1 to about 10% one or more rare earth elements; or
about 5 to about 15% Ti, about 18 to about 29% Zr, about 3.0 to about 13% V, about 1 to about 10% Cr, about 6 to about 18% Mn, about 29 to about 41% Ni, about 0.1 to about 0.7% Al, about 2 to about 11% Co and about 0.7 to about 8% one or more rare earth elements; or
about 11% to about 13% Ti, about 21 to about 23% Zr, about 9 to about 11% V, about 6 to about 9% Cr, about 6 to about 9% Mn, about 31 to about 34% Ni, about 0.3 to about 0.6% Al, about 2 to about 8% Co and about 1 to about 7% one or more rare earth elements,
where the percents are atomic % and in total equal 100%.

E29. An alloy according to any of the preceding embodiments which exhibits an high rate dischargeability of about 93%, about 94%, about 95%, about 96% or about 97% at the $3^{rd}$ cycle; or ≥93%, ≥94%, ≥95%, ≥96% or ≥97% at the $3^{rd}$ cycle, defined as the ratio of discharge capacity measured at 50 mA $g^{-1}$ to that measured at 4 mA $g^{-1}$, measured in a flooded cell configuration against a partially pre-charged Ni(OH)$_2$ positive electrode with no alkaline pretreatment applied before the half-cell measurement and where each sample electrode is charged at a constant current density of 50 mA $g^{-1}$ for 10 h and then discharged at a current density of 50 mA $g^{-1}$ followed by two pulls at 12 and 4 mA $g^{-1}$; and/or
exhibits a charge transfer resistance (R) at −40° C. for the main phase or main phases of ≤10, ≤9, ≤8, ≤7, ≤6, ≤5 or ≤4 Ω·g; or from about 2 to about 10, from about 3 to about 9, from about 3 to about 8, from about 3 to about 7, from about 3 to about 6, from about 3 to about 5 or from about 3 to about 4 Ω·g; and/or
exhibits a charge transfer resistance (R) at −40° C. of from about 5 to about 20, about 7 to about 18, about 9 to about 16, from about 10 to about 15 or from about 11 to about 15 Ω·g; and/or
exhibits a surface catalytic ability at −40° C. of the main phase or main phases of from about 1 to about 5, from about 1 to about 4, from about 1 to about 3 or from about 1.5 to about 2.5 seconds; or ≤4, ≤3 or ≤2 seconds.

Following are another set of embodiments.

E1. A hydrogen storage alloy, for example a hydrogen storage alloy having improved low temperature properties, comprising a metal region adjacent to a boundary region, for example comprising metal regions separated by a boundary region, where the boundary region has a length and an average width, where the average width is from about 12 nm to about 1100 nm, from about 17 to about 1000 nm, from about 20 nm to about 1000 nm, from about 20 nm to about 900 nm, from about 20 nm to about 800 nm, from about 20 nm to about 700 nm, from about 17 nm to about 600 nm, from about 20 nm to about 500 nm, from about 25 nm to about 400 nm, from about 30 nm to about 300 nm, from about 35 nm to about 200 nm or from about 40 nm to about 100 nm.

E2. A hydrogen storage alloy according to embodiment 1, where the boundary region comprises a metal oxide, for example a Ni and/or Cr metal oxide, for instance a Ni/Cr metal oxide.

E3. An alloy according to embodiment 2, where the metal oxide contains ≥60 at % oxygen, ≥62 at % oxygen, ≥64 at % oxygen, ≥66 at % oxygen or ≥68 at % oxygen; or contains from about 60 at % to about 82 at % oxygen, from about 63 to about 77 at % oxygen, from about 64 at % to about 75 at % oxygen, from about 65 at % to about 72 at % oxygen or from about 66 at % to about 70 at % oxygen; or contains about 60 at %, about 61, about 62, about 63, about 64, about 65, about 66, about 67, about 68, about 69, about 70, about 71, about 72, about 73, about 74, about 75, about 76, about 77, about 78, about 79, about 80, about 81 or about 82 at % oxygen, based on the metal oxide, based on the metal oxide.

E4. An alloy according to embodiments 2 or 3, where the metal oxide contains ≥2 at % Cr, ≥3 at % Cr, ≥4 at % Cr or ≥5 at % Cr; or contains from about 2 at % to about 8 at % Cr, from about 3 at % to about 8 at % Cr or from about 4 at % to about 7 at % Cr; or about 2 at %, about 3, about 4, about 5, about 6, about 7 or about 8 at % Cr, based on the metal oxide.

E5. An alloy according to any of embodiments 2-4 where the metal oxide contains ≥16 at % Ni, ≥17 at % Ni, ≥18 at % Ni or ≥19 at % Ni; or contains from about 16 at % to about 23 at % Ni, from about 17 at % to about 22 at % Ni or from about 18 to about 21 at % Ni; or about 16 at %, about 17, about 18, about 19, about 20, about 21, about 22 or about 23 at % Ni, based on the metal oxide.

E6. An alloy according to any of embodiments 2-5, where the Ni/Cr oxide contains from about 64 at % to about 71 at % oxygen, from about 3 at % to about 8 at % Cr and from about 16 at % to about 21 at % Ni, based on the metal oxide.

E7. An alloy according to any of embodiments 2-6 where the Ni/Cr oxide contains oxygen, Ni, Cr and one or more elements selected from the group consisting of Al, Ti, V, Mn, Co and Zr.

E8. An alloy according to any of the preceding embodiments, where the boundary region has a length and an average width and comprises at least one channel which runs along the length of the boundary region; where the channel may be capable of allowing transport of electrolyte to a bulk metal region.

E9. An alloy according to any of the preceding embodiments where the boundary region comprises at least one channel having an average width of from about 4 nm to about 40 nm, from about 5 nm to about 35 nm, from about 7 nm to about 30 nm or from about 8 nm to about 25 nm.

E10. An alloy according to any of the preceding embodiments, where the boundary region comprises a transition oxide zone adjacent to a metal region.

E11. An alloy according to any of the preceding embodiments, where the boundary region has a length and an average width and comprises a transition oxide zone adjacent to a metal region which transition zone runs along the length of the boundary region.

E12. An alloy according to any of the preceding embodiments, where the boundary region comprises a transition oxide zone adjacent to a metal region which transition oxide zone has an average width of from about 4 nm to about 30 nm, from about 5 nm to about 25 nm, from about 7 nm to about 20 nm or from about 8 nm to about 17 nm.

E13. An alloy according to any of the preceding embodiments, where the boundary region comprises a metal oxide zone.

E14. An alloy according to any of the preceding embodiments, where the boundary region has a length and an average width and comprises a metal oxide zone which runs along the length of the boundary region.

E15. An alloy according to any of the preceding embodiments, where the boundary region comprises a metal oxide zone having an average width of from about 5 nm to about 500 nm, from about 6 nm to about 400 nm, from about 7 nm to about 300 nm, from about 8 nm to about 200 nm or from about 8 nm to about 100 nm.

E16. An alloy according to any of the preceding embodiments, where the boundary region has a length and an average width and comprises across the width a first transition oxide zone, a metal oxide zone and a second transition oxide zone, each running along the length of the boundary region; or comprises across the width a first transition oxide zone, a metal oxide zone and a second transition oxide zone, where each are aligned with the others.

E17. An alloy according to any of the preceding embodiments, where the boundary region has a length and an average width and comprises across the width a first transition oxide zone, a channel and a second transition oxide zone, each running along the length of the boundary region; or comprises across the width a first transition oxide zone, a channel and a second transition oxide zone, each aligned with the others.

E18. An alloy according to any of the preceding embodiments, where the boundary region has a length and an average width and comprises across the width a first transition oxide zone, a metal oxide zone, a channel and a second transition oxide zone, each running along the length of the boundary region; or comprises across the width a first transition oxide zone, a metal oxide zone, a channel and a second transition oxide zone, each aligned with the others.

E19. An alloy according to any of the preceding embodiments where the boundary region has a length and an average width, where the length is $\geq 4$ times, $\geq 8$ times, $\geq 12$ times, $\geq 16$ times, $\geq 20$ times or $\geq 24$ times the average width; or the boundary region has a length and an average width, where the length is $\geq 4$ times, $\geq 8$ times, $\geq 12$ times, $\geq 16$ times, $\geq 20$ times or $\geq 24$ times the average width and where the width is substantially uniform along the length.

E20. An alloy according to any of the preceding embodiments, where the boundary region has an average width of from about 20 nm to about 500 nm.

E21. An alloy according to any of the preceding embodiments comprising from about 0.1 at % to about 10.0 at % one or more rare earth elements, from about 0.7 to about 8.0 at %, from about 1.0 to about 7.0 at %, from about 1.5 to about 6.0 at % or from about 2.0 to about 5.5 at % one or more rare earth elements; or about 1.5, about 2.0, about 2.5, about 3.0, about 3.5, about 4.0, about 4.5, about 5.0, about 5.5, about 6.0, about 6.5, about 7.0, about 7.5 or about 8.0 at % one or more rare earth elements and levels in between.

E22. An alloy according to any of the preceding embodiments which comprises at least one main phase and at least one secondary phase.

E23. An alloy according to any of the preceding embodiments which comprises at least one main phase and a secondary phase, which secondary phase comprises one or more rare earth elements.

E24. An alloy according to any of the preceding embodiments, comprising at least one main phase and a secondary phase, where the secondary phase comprises Ni.

E25. An alloy according to any of the preceding embodiments, comprising at least one main phase and a secondary phase, where the secondary phase comprises La and Ni.

E26. An alloy according to any of the preceding embodiments, comprising
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements,
for example where the atomic ratio of ii) to i) is from about 2.02 to about 2.45. For example, the ii) to i) atomic ratio is from about 2.04 to about 2.40, from about 2.10 to about 2.38, from about 2.20 to about 2.36 or from about 2.20 to about 2.36.

E27. An alloy according to any of the preceding embodiments, comprising a C14 or C15 main Laves phase or comprising C14 and C15 main Laves phases.

E28. An alloy according to any of the preceding embodiments, comprising
a C14 or C15 main Laves phase or C14 and C15 main Laves phases,
>0.5 wt % of an electrochemically active storage secondary phase comprising La and Ni and from about 0.3 wt % to about 15 wt % of a catalytic secondary phase comprising Ti and Ni.

E29. An alloy according to any of the preceding embodiments, comprising
Ti, Zr, V, Ni, Cr and one or more rare earth elements; or
Ti, Zr, Ni, Mn, Cr and one or more rare earth elements; or
Ti, Cr, V, Ni and one or more rare earth elements; or
Ti, Zr, V, Ni, Cr and one or more elements selected from the group consisting of B, Al, Si, Sn and other transition metals; or
Ti, Zr, V, Ni, Cr, one or more rare earth elements and one or more elements selected from the group consisting of Mn, Sn, Al, Cu, Mo, W, Fe, Si and Co; or
Ti, Zr, V, Ni, Cr, one or more rare earth elements and one or more elements selected from the group consisting of Mn and Al; or
Ti, Zr, V, Ni, Cr, Mn, Al, Co and one or more rare earth elements; or
Ti, Zr, V, Ni, Cr, Mn, Al, Co and La.

E30. An alloy according to any of the preceding embodiments, comprising
about 0.1 to about 60% Ti, about 0.1 to about 40% Zr, 0<V<60%, about 1% to about 56% Cr, about 5 to about 22%

Mn, about 0.1 to about 57% Ni, 0 to about 3% Sn, about 0.1 to about 10% Al, about 0.1 to about 11% Co and about 0.1 to about 10% one or more rare earth elements; or about 5 to about 15% Ti, about 18 to about 29% Zr, about 3.0 to about 13% V, about 1 to about 10% Cr, about 6 to about 18% Mn, about 29 to about 41% Ni, about 0.1 to about 0.7% Al, about 2 to about 11% Co and about 0.7 to about 8% one or more rare earth elements; or about 11% to about 13% Ti, about 21 to about 23% Zr, about 9 to about 11% V, about 6 to about 9% Cr, about 6 to about 9% Mn, about 31 to about 34% Ni, about 0.3 to about 0.6% Al, about 2 to about 8% Co and about 1 to about 7% one or more rare earth elements, where the percents are atomic % and in total equal 100%.

E31. An alloy according to any of the preceding embodiments which exhibits an high rate dischargeability of about 93%, about 94%, about 95%, about 96% or about 97% at the $3^{rd}$ cycle; or ≥93%, ≥94%, ≥95%, ≥96% or ≥97% at the $3^{rd}$ cycle, defined as the ratio of discharge capacity measured at 50 mA g$^{-1}$ to that measured at 4 mA g$^{-1}$, measured in a flooded cell configuration against a partially pre-charged Ni(OH)$_2$ positive electrode with no alkaline pretreatment applied before the half-cell measurement and where each sample electrode is charged at a constant current density of 50 mA g$^{-1}$ for 10 h and then discharged at a current density of 50 mA g$^{-1}$ followed by two pulls at 12 and 4 mA g$^{-1}$; and/or exhibits a charge transfer resistance (R) at −40° C. for the main phase or main phases of ≤10, ≤9, ≤8, ≤7, ≤6, ≤5 or ≤4 Ω·g; or from about 2 to about 10, from about 3 to about 9, from about 3 to about 8, from about 3 to about 7, from about 3 to about 6, from about 3 to about 5 or from about 3 to about 4 Ω·g; and/or exhibits a charge transfer resistance (R) at −40° C. of from about 5 to about 20, about 7 to about 18, about 9 to about 16, from about 10 to about 15 or from about 11 to about 15 Ω·g; and/or exhibits a surface catalytic ability at −40° C. of the main phase or main phases of from about 1 to about 5, from about 1 to about 4, from about 1 to about 3 or from about 1.5 to about 2.5 seconds; or ≤4, ≤3 or ≤2 seconds.

Following are another set of embodiments.

E1. A hydrogen storage alloy, for instance a hydrogen storage alloy having improved low temperature properties, comprising a bulk metal region or regions and a metal oxide zone comprising a metal oxide, which oxide zone is aligned with at least one channel; where the channel may be capable of allowing transport of electrolyte to a bulk region.

E2. A hydrogen storage alloy according to embodiment 1, where the metal oxide is a Ni and/or Cr metal oxide, for example a Ni/Cr metal oxide.

E3. An alloy according to embodiments 1 or 2, where the metal oxide contains ≥60 at % oxygen, ≥62 at % oxygen, ≥64 at % oxygen, ≥66 at % oxygen or ≥68 at % oxygen; or contains from about 60 at % to about 82 at % oxygen, from about 63 to about 77 at % oxygen, from about 64 at % to about 75 at % oxygen, from about 65 at % to about 72 at % oxygen or from about 66 at % to about 70 at % oxygen; or contains about 60 at %, about 61, about 62, about 63, about 64, about 65, about 66, about 67, about 68, about 69, about 70, about 71, about 72, about 73, about 74, about 75, about 76, about 77, about 78, about 79, about 80, about 81 or about 82 at % oxygen, based on the metal oxide.

E4. An alloy according to any of the preceding embodiments, where the metal oxide contains from about 60 at % to about 82 at % oxygen, based on the metal oxide.

E5. An alloy according to any of the preceding embodiments, where the metal oxide contains ≥2 at % Cr, ≥3 at % Cr, ≥4 at % Cr or ≥5 at % Cr; or contains from about 2 at % to about 8 at % Cr, from about 3 at % to about 8 at % Cr or from about 4 at % to about 7 at % Cr; or about 2 at %, about 3, about 4, about 5, about 6, about 7 or about 8 at % Cr, based on the metal oxide.

E6. An alloy according to any of the preceding embodiments, where the metal oxide contains ≥16 at % Ni, ≥17 at % Ni, ≥18 at % Ni or ≥19 at % Ni; or contains from about 16 at % to about 23 at % Ni, from about 17 at % to about 22 at % Ni or from about 18 to about 21 at % Ni; or about 16 at %, about 17, about 18, about 19, about 20, about 21, about 22 or about 23 at % Ni, based on the metal oxide.

E7. An alloy according to any of the preceding embodiments, where the metal oxide contains from about 64 at % to about 71 at % oxygen, from about 3 at % to about 8 at % Cr and from about 16 at % to about 21 at % Ni, based on the metal oxide.

E8. An alloy according to any of the preceding embodiments, where the metal oxide contains oxygen, Ni, Cr and one or more elements selected from the group consisting of Al, Ti, V, Mn, Co and Zr, for example where the one or more elements selected from the group consisting of Al, Ti, V, Mn, Co and Zr are present in the oxide in total from about 1 at % to about 17 at %, from about 2 at % to about 14 at %, from about 3 at % to about 12 at %, from about 3 at % to about 10 at % or from about 4 at % to about 9 at %, based on the metal oxide.

E9. An alloy according to any of the preceding embodiments, where the channel has a length and an average width, where the length is ≥8 times, ≥12 times, ≥16 times, ≥20 times or ≥24 times the average width E10. An alloy according to any of the preceding embodiments, where the at least one channel has an average width of from about 4 nm to about 40 nm, from about 5 nm to about 35 nm, from about 7 nm to about 30 nm or from about 8 nm to about 25 nm.

E11. An alloy according to any of the preceding embodiments, where the channel is adjacent to a transition oxide zone adjacent to a metal region, which transition oxide zone has an average width of from about 4 nm to about 30 nm, from about 5 nm to about 25 nm, from about 7 nm to about 20 nm or from about 8 nm to about 17 nm.

E12. An alloy according to any of the preceding embodiments, where the metal oxide zone has an average width of from about 5 nm to about 500 nm, from about 6 nm to about 400 nm, from about 7 nm to about 300 nm, from about 8 nm to about 200 nm or from about 8 nm to about 100 nm.

E13. An alloy according to any of the preceding embodiments, comprising a transition oxide zone, which transition zone is aligned with the metal oxide zone.

E14. An alloy according to any of the preceding embodiments, comprising from about 0.1 at % to about 10.0 at % one or more rare earth elements, from about 0.7 to about 8.0 at %, from about 1.0 to about 7.0 at %, from about 1.5 to about 6.0 at % or from about 2.0 to about 5.5 at % one or more rare earth elements; or about 1.5, about 2.0, about 2.5, about 3.0, about 3.5, about 4.0, about 4.5, about 5.0, about 5.5, about 6.0, about 6.5, about 7.0, about 7.5 or about 8.0 at % one or more rare earth elements and levels in between.

E15. An alloy according to any of the preceding embodiments which comprises at least one main phase and at least one secondary phase.

E16. An alloy according to any of the preceding embodiments which comprises at least one main phase and a secondary phase, which secondary phase comprises one or more rare earth elements.

E17. An alloy according to any of the preceding embodiments, comprising at least one main phase and a secondary phase, where the secondary phase comprises Ni.

E18. An alloy according to any of the preceding embodiments, comprising at least one main phase and a secondary phase, where the secondary phase comprises La and Ni.

E19. An alloy according to any of the preceding embodiments, comprising
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements,
for example where the atomic ratio of ii) to i) is from about 2.02 to about 2.45. For example, the ii) to i) atomic ratio is from about 2.04 to about 2.40, from about 2.10 to about 2.38, from about 2.20 to about 2.36 or from about 2.20 to about 2.36.

E20. An alloy according to any of the preceding embodiments, comprising a C14 or C15 main Laves phase or comprising C14 and C15 main Laves phases.

E21. An alloy according to any of the preceding embodiments, comprising
a C14 or C15 main Laves phase or C14 and C15 main Laves phases,
>0.5 wt % of an electrochemically active storage secondary phase comprising La and Ni and
from about 0.3 wt % to about 15 wt % of a catalytic secondary phase comprising Ti and Ni.

E22. An alloy according to any of the preceding embodiments, comprising
Ti, Zr, V, Ni, Cr and one or more rare earth elements; or
Ti, Zr, Ni, Mn, Cr and one or more rare earth elements; or
Ti, Cr, V, Ni and one or more rare earth elements; or
Ti, Zr, V, Ni, Cr and one or more elements selected from the group consisting of B, Al, Si, Sn and other transition metals; or
Ti, Zr, V, Ni, Cr, one or more rare earth elements and one or more elements selected from the group consisting of Mn, Sn, Al, Cu, Mo, W, Fe, Si and Co; or
Ti, Zr, V, Ni, Cr, one or more rare earth elements and one or more elements selected from the group consisting of Mn and Al; or
Ti, Zr, V, Ni, Cr, Mn, Al, Co and one or more rare earth elements; or
Ti, Zr, V, Ni, Cr, Mn, Al, Co and La.

E23. An alloy according to any of the preceding embodiments, comprising
about 0.1 to about 60% Ti, about 0.1 to about 40% Zr, 0<V<60%, about 1% to about 56% Cr, about 5 to about 22% Mn, about 0.1 to about 57% Ni, 0 to about 3% Sn, about 0.1 to about 10% Al, about 0.1 to about 11% Co and about 0.1 to about 10% one or more rare earth elements; or
about 5 to about 15% Ti, about 18 to about 29% Zr, about 3.0 to about 13% V, about 1 to about 10% Cr, about 6 to about 18% Mn, about 29 to about 41% Ni, about 0.1 to about 0.7% Al, about 2 to about 11% Co and about 0.7 to about 8% one or more rare earth elements; or
about 11% to about 13% Ti, about 21 to about 23% Zr, about 9 to about 11% V, about 6 to about 9% Cr, about 6 to about 9% Mn, about 31 to about 34% Ni, about 0.3 to about 0.6% Al, about 2 to about 8% Co and about 1 to about 7% one or more rare earth elements,
where the percents are atomic % and in total equal 100%.

E24. An alloy according to any of the preceding embodiments which exhibits an high rate dischargeability of about 93%, about 94%, about 95%, about 96% or about 97% at the $3^{rd}$ cycle; or $\geq 93\%$, $\geq 94\%$, $\geq 95\%$, $\geq 96\%$ or $\geq 97\%$ at the $3^{rd}$ cycle, defined as the ratio of discharge capacity measured at 50 mA $g^{-1}$ to that measured at 4 mA $g^{-1}$, measured in a flooded cell configuration against a partially pre-charged $Ni(OH)_2$ positive electrode with no alkaline pretreatment applied before the half-cell measurement and where each sample electrode is charged at a constant current density of 50 mA $g^{-1}$ for 10 h and then discharged at a current density of 50 mA $g^{-1}$ followed by two pulls at 12 and 4 mA $g^{-1}$; and/or exhibits a charge transfer resistance (R) at $-40°$ C. for the main phase or main phases of $\leq 10$, $\leq 9$, $\leq 8$, $\leq 7$, $\leq 6$, $\leq 5$ or $\leq 4$ $\Omega \cdot g$; or from about 2 to about 10, from about 3 to about 9, from about 3 to about 8, from about 3 to about 7, from about 3 to about 6, from about 3 to about 5 or from about 3 to about 4 $\Omega \cdot g$; and/or
exhibits a charge transfer resistance (R) at $-40°$ C. of from about 5 to about 20, about 7 to about 18, about 9 to about 16, from about 10 to about 15 or from about 11 to about 15 $\Omega \cdot g$; and/or
exhibits a surface catalytic ability at $-40°$ C. of the main phase or main phases of from about 1 to about 5, from about 1 to about 4, from about 1 to about 3 or from about 1.5 to about 2.5 seconds; or $\leq 4$, $\leq 3$ or $\leq 2$ seconds.

Some additional embodiments of the invention are below.

E1. A hydrogen storage alloy, for example a hydrogen storage alloy having improved low temperature electrochemical properties, comprising a Ni and/or Cr metal oxide, for example a Ni/Cr metal oxide; for example comprising a Ni/Cr metal oxide which contains Ni and Cr where each are present in a higher atomic percentage than each other metal.

E2. An alloy according to embodiment 1, where the metal oxide contains $\geq 60$ at % oxygen, $\geq 62$ at % oxygen, $\geq 64$ at % oxygen, $\geq 66$ at % oxygen or $\geq 68$ at % oxygen; or contains from about 60 at % to about 82 at % oxygen, from about 63 to about 77 at % oxygen, from about 64 at % to about 75 at % oxygen, from about 65 at % to about 72 at % oxygen or from about 66 at % to about 70 at % oxygen; or contains about 60 at %, about 61, about 62, about 63, about 64, about 65, about 66, about 67, about 68, about 69, about 70, about 71, about 72, about 73, about 74, about 75, about 76, about 77, about 78, about 79, about 80, about 81 or about 82 at % oxygen, based on the metal oxide.

E3. An alloy according to embodiments 1 or 2, where the metal oxide contains from about 60 at % to about 82 at % oxygen, based on the metal oxide.

E4. An alloy according to any of the preceding embodiments, where the metal oxide contains $\geq 2$ at % Cr, $\geq 3$ at % Cr, $\geq 4$ at % Cr or $\geq 5$ at % Cr; or contains from about 2 at % to about 8 at % Cr, from about 3 at % to about 8 at % Cr or from about 4 at % to about 7 at % Cr; or about 2 at %, about 3, about 4, about 5, about 6, about 7 or about 8 at % Cr, based on the metal oxide.

E5. An alloy according to any of the preceding embodiments where the metal oxide contains from about 2 at % to about 8 at % Cr, based on the metal oxide.

E6. An alloy according to any of the preceding embodiments, where the metal oxide contains ≥16 at % Ni, ≥17 at % Ni, ≥18 at % Ni or ≥19 at % Ni; or contains from about 16 at % to about 23 at % Ni, from about 17 at % to about 22 at % Ni or from about 18 to about 21 at % Ni; or about 16 at %, about 17, about 18, about 19, about 20, about 21, about 22 or about 23 at % Ni, based on the metal oxide.

E7. An alloy according to any of the preceding embodiments where the metal oxide contains from about 16 at % to about 23 at % Ni, based on the metal oxide.

E8. An alloy according to any of the preceding embodiments where the metal oxide contains from about 64 at % to about 71 at % oxygen, from about 3 at % to about 8 at % Cr and from about 16 at % to about 21 at % Ni, based on the metal oxide.

E9. An alloy according to any of the preceding embodiments where the metal oxide contains one or more elements selected from the group consisting of B, Al, Si, Sn and transition metals.

E10. An alloy according to any of the preceding embodiments where the metal oxide contains one or more elements selected from the group consisting of Al, Ti, V, Mn, Co and Zr.

E11. An alloy according to any of the preceding embodiments where the metal oxide contains one or more elements selected from the group consisting of B, Si, Sn, Al, Ti, V, Mn, Co and Zr in total from about 1 at % to about 17 at %, from about 2 at % to about 14 at %, from about 3 at % to about 12 at %, from about 3 at % to about 10 at % or from about 4 at % to about 9 at %.

E12. An alloy according to any of the preceding embodiments where the metal oxide resides in a boundary region adjacent to a metal region, for example in a boundary region which separates metal regions; for instance the metal oxide resides in a metal oxide zone which resides in the boundary region.

E13. An alloy according to embodiment 12 where the boundary region has a length and an average width and comprises at least one channel which runs lengthwise in the boundary region.

E14. An alloy according to embodiments 12 or 13, where the boundary region comprises at least one channel having an average width of from about 4 nm to about 40 nm, from about 5 nm to about 35 nm, from about 7 nm to about 30 nm or from about 8 nm to about 25 nm.

E15. An alloy according to any of embodiments 12-14, where the boundary region has a length and an average width and comprises a transition oxide zone adjacent to a metal region which transition zone runs lengthwise in the boundary region.

E16. An alloy according to any of embodiments 12-15, where the boundary region comprises a transition oxide zone adjacent to a metal region which transition oxide zone has an average width of from about 4 nm to about 30 nm, from about 5 nm to about 25 nm, from about 7 nm to about 20 nm or from about 8 nm to about 17 nm.

E17. An alloy according to any of embodiments 12-16 where the boundary region has a length and an average width and comprises a metal oxide zone which runs lengthwise in the boundary region.

E18. An alloy according to any of embodiments 12-17, where the boundary region comprises a metal oxide zone having an average width of from about 5 nm to about 500 nm, from about 6 nm to about 400 nm, from about 7 nm to about 300 nm, from about 8 nm to about 200 nm or from about 8 nm to about 100 nm.

E19. An alloy according to any of embodiments 12-18, where the boundary region has a length and an average width and comprises across the width a first transition oxide zone, a metal oxide zone and a second transition oxide zone, each aligned with the others; or which comprises across the width a first transition oxide zone, a metal oxide zone and a second transition oxide zone each running along the length of the boundary region.

E20. An alloy according to any of embodiments 12-19, where the boundary region has a length and an average width and comprises across the width a first transition oxide zone, a channel and a second transition oxide zone, each aligned with the others; or which comprises across the width a first transition oxide zone, a channel and a second transition oxide zone, each running along the length of the boundary region.

E21. An alloy according to any of embodiments 12-20, where the boundary region has a length and an average width and comprises across the width a first transition oxide zone, a metal oxide zone, a channel and a second transition oxide zone, each aligned with the others; or which comprises across the width a first transition oxide zone, a metal oxide zone, a channel and a second transition oxide zone, each running along the length of the boundary region.

E22. An alloy according to any of embodiments 12-21, where the boundary region has a length and an average width, where the length is ≥4 times, ≥8 times, ≥12 times, ≥16 times, ≥20 times or ≥24 times the average width; or the boundary region has a length and an average width, where the length is ≥4 times, ≥8 times, ≥12 times, ≥16 times, ≥20 times or ≥24 times the average width and where the width is substantially uniform along the length.

E23. An alloy according to any of embodiments 12-22, where the boundary region has an average width of from about 12 nm to about 1100 nm, from about 17 to about 1000 nm, from about 20 nm to about 1000 nm, from about 20 nm to about 900 nm, from about 20 nm to about 800 nm, from about 20 nm to about 700 nm, from about 17 nm to about 600 nm, from about 20 nm to about 500 nm, from about 25 nm to about 400 nm, from about 30 nm to about 300 nm, from about 35 nm to about 200 nm or from about 40 nm to about 100 nm.

E24. An alloy according to any of the preceding embodiments comprising from about 0.1 at % to about 10.0 at % one or more rare earth elements, from about 0.7 to about 8.0 at %, from about 1.0 to about 7.0 at %, from about 1.5 to about 6.0 at % or from about 2.0 to about 5.5 at % one or more rare earth elements; or about 1.5, about 2.0, about 2.5, about 3.0, about 3.5, about 4.0, about 4.5, about 5.0, about 5.5, about 6.0, about 6.5, about 7.0, about 7.5 or about 8.0 at % one or more rare earth elements and levels in between.

E25. An alloy according to any of the preceding embodiments which comprises at least one main phase and at least one secondary phase.

E26. A alloy according to any of the preceding embodiments which comprises at least one main phase and a secondary phase, which secondary phase comprises one or more rare earth elements.

E27. An alloy according to any of the preceding embodiments comprising at least one main phase and a secondary phase, where the secondary phase comprises Ni.

E28. An alloy according to any of the preceding embodiments comprising i) one or more elements selected from the group consisting of Ti, Zr, Nb and Hf and
ii) Ni and/or Cr and one or more elements selected from the group consisting of B, Al, Si, Sn, other transition metals and rare earth elements; or
i) one or more elements selected from the group consisting of Ti, Zr, Nb and Hf and
ii) Ni and/or Cr and one or more elements selected from the group consisting of V, Mn, Sn, Al, Co, Cu, Mo, W, Fe, Si and rare earth elements,
for example where the atomic ratio of ii) to i) is from about 2.02 to about 2.45. For example, the ii) to i) atomic ratio is from about 2.04 to about 2.40, from about 2.10 to about 2.38, from about 2.20 to about 2.36 or from about 2.20 to about 2.36.

E29. An alloy according to any of the preceding embodiments comprising a C14 or C15 main Laves phase or comprising C14 and C15 main Laves phases.

E30. An alloy according to any of the preceding embodiments comprising
a C14 or C15 main Laves phase or C14 and C15 main Laves phases,
>0.5 wt % of an electrochemically active storage secondary phase comprising La and Ni and
from about 0.3 wt % to about 15 wt % of a catalytic secondary phase comprising Ti and Ni.

E31. An alloy according to any of the preceding embodiments comprising
Ti, Zr, V, Ni, Cr and one or more rare earth elements; or
Ti, Zr, Ni, Mn, Cr and one or more rare earth elements; or
Ti, Cr, V, Ni and one or more rare earth elements; or
Ti, Zr, V, Ni, Cr and one or more elements selected from the group consisting of B, Al, Si, Sn and other transition metals; or
Ti, Zr, V, Ni, Cr, one or more rare earth elements and one or more elements selected from the group consisting of Mn, Sn, Al, Cu, Mo, W, Fe, Si and Co; or
Ti, Zr, V, Ni, Cr, one or more rare earth elements and one or more elements selected from the group consisting of Mn and Al; or
Ti, Zr, V, Ni, Cr, Mn, Al, Co and one or more rare earth elements; or
Ti, Zr, V, Ni, Cr, Mn, Al, Co and La.

E32. An alloy according to any of the preceding embodiments comprising
about 0.1 to about 60% Ti, about 0.1 to about 40% Zr, 0<V<60%, about 1% to about 56% Cr, about 5 to about 22% Mn, about 0.1 to about 57% Ni, 0 to about 3% Sn, about 0.1 to about 10% Al, about 0.1 to about 11% Co and about 0.1 to about 10% one or more rare earth elements; or
about 5 to about 15% Ti, about 18 to about 29% Zr, about 3.0 to about 13% V, about 1 to about 10% Cr, about 6 to about 18% Mn, about 29 to about 41% Ni, about 0.1 to about 0.7% Al, about 2 to about 11% Co and about 0.7 to about 8% one or more rare earth elements; or
about 11% to about 13% Ti, about 21 to about 23% Zr, about 9 to about 11% V, about 6 to about 9% Cr, about 6 to about 9% Mn, about 31 to about 34% Ni, about 0.3 to about 0.6% Al, about 2 to about 8% Co and about 1 to about 7% one or more rare earth elements,
where the percents are atomic % and in total equal 100%.

E33. An alloy according to any of the preceding embodiments, where the metal oxide is a Ni and/or Cr metal oxide, for example a Ni/Cr metal oxide.

E34. An alloy according to any of the preceding embodiments which exhibits an high rate dischargeability of about 93%, about 94%, about 95%, about 96% or about 97% at the $3^{rd}$ cycle; or ≥93%, ≥94%, ≥95%, ≥96% or ≥97% at the $3^{rd}$ cycle, defined as the ratio of discharge capacity measured at 50 mA g$^{-1}$ to that measured at 4 mA g$^{-1}$, measured in a flooded cell configuration against a partially pre-charged Ni(OH)$_2$ positive electrode with no alkaline pretreatment applied before the half-cell measurement and where each sample electrode is charged at a constant current density of 50 mA g$^{-1}$ for 10 h and then discharged at a current density of 50 mA g$^{-1}$ followed by two pulls at 12 and 4 mA g$^{-1}$; and/or
exhibits a charge transfer resistance (R) at −40° C. for the main phase or main phases of ≤10, ≤9, ≤8, ≤7, ≤6, ≤5 or ≤4 Ω·g; or from about 2 to about 10, from about 3 to about 9, from about 3 to about 8, from about 3 to about 7, from about 3 to about 6, from about 3 to about 5 or from about 3 to about 4 Ω·g; and/or
exhibits a charge transfer resistance (R) at −40° C. of from about 5 to about 20, about 7 to about 18, about 9 to about 16, from about 10 to about 15 or from about 11 to about 15 Ω·g; and/or
exhibits a surface catalytic ability at −40° C. of the main phase or main phases of from about 1 to about 5, from about 1 to about 4, from about 1 to about 3 or from about 1.5 to about 2.5 seconds; or ≤4, ≤3 or ≤2 seconds.

Following are further embodiments of the invention.

E1. A metal hydride battery, a solid hydrogen storage media, an alkaline fuel cell or a metal hydride air battery comprising a hydrogen storage alloy according to any of the before mentioned embodiments (any embodiment of the previous 5 sets of embodiments).

E2. A metal hydride battery comprising at least one anode capable of reversibly charging and discharging hydrogen, at least one cathode capable of reversible oxidation, a casing having said anode and cathode positioned therein, a separator separating the cathode and the anode and an electrolyte in contact with both the anode and the cathode, where the anode comprises a hydrogen storage alloy according to any of the embodiments of the above 5 sets of embodiments.

E3. An alkaline fuel cell comprising at least one hydrogen electrode, at least one oxygen electrode and at least one gas diffusion material, where the hydrogen electrode comprises a hydrogen storage alloy according to any of the embodiments of the above 5 sets of embodiments.

E4. A metal hydride air battery comprising at least one air permeable cathode, at least one anode, at least one air inlet and an electrolyte in contact with both the anode and the cathode, where the anode comprises a hydrogen storage alloy according to any of the embodiments of the above 5 sets of embodiments.

E5. Use of an alloy according to any of the embodiments of the above 5 sets of embodiments in an electrode in a metal hydride battery, a fuel cell or a metal hydride air battery.

E6. Use of an alloy according to any of the embodiments of the above 5 sets of embodiments as a hydrogen storage media.

EXAMPLE 1

La Modified Ti—Zr—V—Cr—Mn—Ni—Al—Co Alloys

Arc melting is performed under a continuous argon flow with a non-consumable tungsten electrode and a water-cooled copper tray. Before each run, a piece of sacrificial titanium undergoes a few melting/cooling cycles to reduce the residual oxygen concentration in the system. Each 12 g ingot is re-melted and turned over a few times to ensure uniformity in chemical composition. The chemical composition of each sample is examined using a Varian LIBERTY 100 inductively coupled plasma optical emission spectrometer (ICP-OES).

The alloys below are designed together with the actual compositions as found by ICP.

| alloy | | Ti | Zr | V | Cr | Mn | Ni | Al | Co | La |
|---|---|---|---|---|---|---|---|---|---|---|
| 0 | design | 12.0 | 22.8 | 10.0 | 7.5 | 8.1 | 32.2 | 0.4 | 7.0 | 0.0 |
|   | ICP | 11.9 | 22.9 | 10.0 | 7.5 | 8.0 | 32.2 | 0.4 | 7.1 | 0.0 |
| 1 | design | 12.0 | 21.8 | 10.0 | 8.1 | 8.1 | 32.2 | 0.4 | 7.0 | 1.0 |
|   | ICP | 11.9 | 22.2 | 10.2 | 7.6 | 7.5 | 32.1 | 0.4 | 7.0 | 0.9 |
| 2 | design | 12.0 | 20.8 | 10.0 | 7.5 | 8.1 | 32.2 | 0.4 | 7.0 | 2.0 |
|   | ICP | 12.2 | 20.7 | 10.3 | 6.4 | 8.0 | 32.5 | 0.6 | 7.2 | 2.1 |
| 3 | design | 12.0 | 19.8 | 10.0 | 7.5 | 8.1 | 32.2 | 0.4 | 7.0 | 3.0 |
|   | ICP | 11.9 | 20.2 | 9.9 | 6.8 | 7.9 | 32.8 | 0.5 | 6.9 | 3.1 |
| 4 | design | 12.0 | 18.8 | 10.0 | 7.5 | 8.1 | 32.2 | 0.4 | 7.0 | 4.0 |
|   | ICP | 12.0 | 19.0 | 9.9 | 7.3 | 8.0 | 32.1 | 0.5 | 7.2 | 3.9 |
| 5 | design | 12.0 | 17.8 | 10.0 | 7.5 | 8.1 | 32.2 | 0.4 | 7.0 | 5.0 |
|   | ICP | 11.8 | 17.9 | 9.9 | 7.4 | 7.9 | 32.6 | 0.4 | 7.1 | 4.9 |

Alloys 2-5 are inventive.
Alloys 0-1 are comparative.

Besides main C14 and C15 phases, two additional phases are identified with a Philips X'PERT PRO X-ray diffractometer (XRD). The abundance of the C14, C15, catalytic secondary TiNi phase and storage secondary LaNi phases are below (XRD, analyzed by JADE 9 software). All alloys are C14 predominant. Abundance is in weight percent, based on the alloy.

| alloy | C14 | C15 | TiNi | LaNi |
|---|---|---|---|---|
| 0 | 85.4 | 11.2 | 3.4 | 0.0 |
| 1 | 75.6 | 21.5 | 2.4 | 0.5 |
| 2 | 80.8 | 15.5 | 3.1 | 0.6 |
| 3 | 80.7 | 15.8 | 2.3 | 1.2 |
| 4 | 82.8 | 14.3 | 1.2 | 1.7 |
| 5 | 88.7 | 8.4 | 0.9 | 2.0 |

A JEOL-JSM6320F scanning electron microscope (SEM) with energy dispersive spectroscopy (EDS) capability is used to study the phase distribution and corresponding compositions. The crystal structure of the TiNi phases, although containing significant amounts of Zr, exhibit a TiNi (B2) structure according to XRD. Inventive alloys 2-5 contain TiNi phases containing from 21.6 to 27.5 at % Ti, from 43.5 to 45.3 at % Ni, from 13.5 to 20.6 at % Zr and from 40.1 to 42.6 at % (Ti+Zr).

Figure 1:
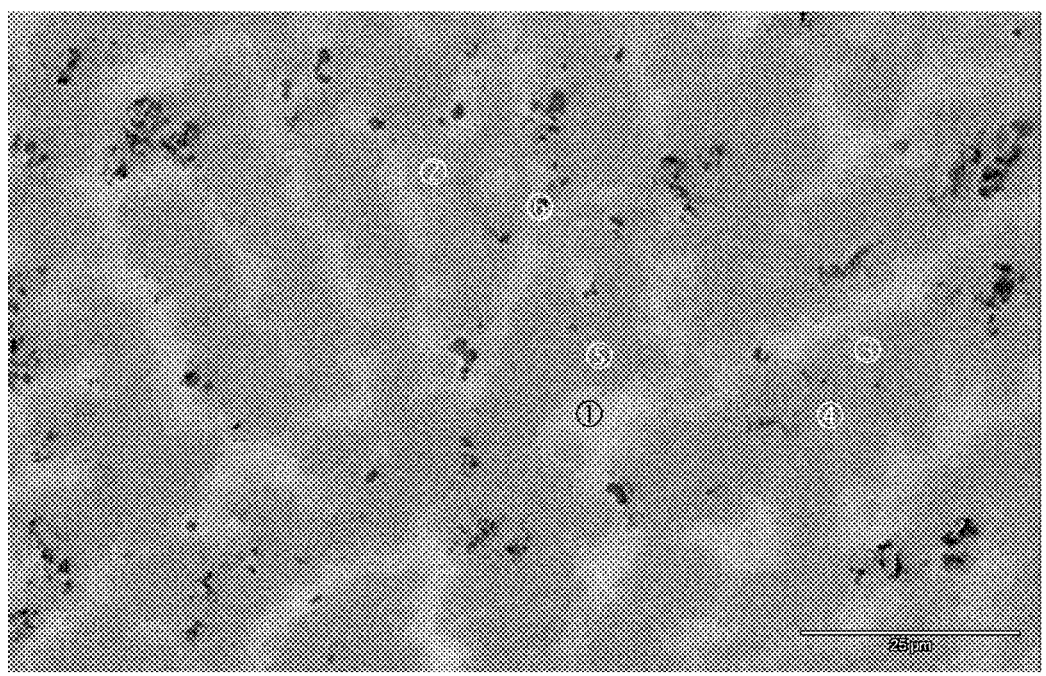
FIG. 1 represents SEM/EDS results of alloy 0 of Example 1.

A SEM/EDS spectra for alloy 0 is shown in FIG. 1. Results are below for the indicated locations.

| location | Ti | Zr | V | Ni | Co | Mn | Cr | Al | La | phase |
|---|---|---|---|---|---|---|---|---|---|---|
| 1 | 21.8 | 22.7 | 1.6 | 45.6 | 5.0 | 2.5 | 0.4 | 0.3 | 0.0 | TiNi |
| 2 | 11.1 | 22.7 | 12.0 | 31.0 | 7.5 | 9.1 | 6.0 | 0.6 | 0.0 | $AB_2$ |
| 3 | 11.7 | 22.6 | 11.3 | 31.7 | 7.4 | 8.9 | 5.6 | 0.6 | 0.0 | $AB_2$ |
| 4 | 10.4 | 23.1 | 12.6 | 27.8 | 7.9 | 9.7 | 7.9 | 0.4 | 0.0 | $AB_2$ |
| 5 | 10.4 | 23.1 | 12.7 | 26.2 | 7.8 | 9.8 | 9.5 | 0.5 | 0.0 | $AB_2$ |
| 6 | 10.2 | 53.2 | 3.9 | 23.7 | 3.4 | 3.4 | 1.7 | 0.3 | 0.0 | $ZrO_2$ |

Figure 2:
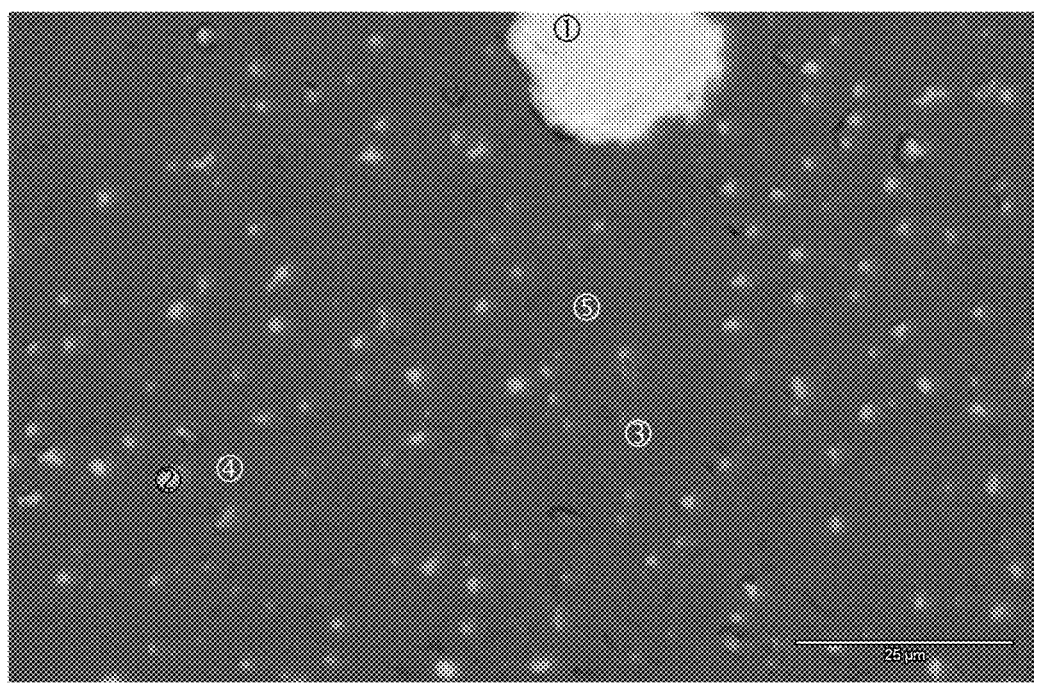
FIG. 2 represents SEM/EDS results of alloy 5 of Example 1.

A SEM/EDS spectra for inventive alloy 5 is shown in FIG. 2. Results are below for the indicated locations.

| location | Ti | Zr | V | Ni | Co | Mn | Cr | Al | La | phase |
|---|---|---|---|---|---|---|---|---|---|---|
| 1 | 0.0 | 0.2 | 0.4 | 49.3 | 0.2 | 0.0 | 0.1 | 0.3 | 49.6 | LaNi |
| 2 | 0.1 | 0.2 | 0.4 | 49.7 | 0.3 | 0.0 | 0.1 | 0.2 | 49.2 | LaNi |
| 3 | 27.3 | 13.7 | 3.0 | 43.7 | 6.5 | 3.4 | 1.3 | 0.6 | 0.4 | TiNi |
| 4 | 11.6 | 19.7 | 12.5 | 29.0 | 8.3 | 8.9 | 9.3 | 0.5 | 0.1 | $AB_2$ |
| 5 | 12.1 | 19.8 | 12.4 | 29.2 | 8.0 | 8.7 | 9.3 | 0.5 | 0.0 | $AB_2$ |

Transmission electron micrograph (TEM) results show that in alloy 0, only random Ni/Ti/Zr oxide is found, lightly oxidized. In alloy 5, both random Ni/Cr oxide (large gap grain boundary) and aligned Ni/Cr oxide (small gap grain boundary) are found, heavily oxidized. TEM analysis is performed with a TECNAI TF-30 Super-Twin TEM with an Oxford X-MAX EDS and a Gatan QUANTUM SE (963) electron energy loss spectrometer (EELS).

Figure 3:
FIG. 3 is a darkfield transmission electron micrograph (TEM) of a boundary region of alloy 0 of Example 1. The oxide interface is dark and the metal regions are bright.

FIG. 3 is a darkfield TEM of a boundary region of alloy 0. The oxide composition of alloy 0, determined by EDS is below.

| O | Al | Ti | V | Cr | Mn | Co | Ni | Zr |
|---|---|---|---|---|---|---|---|---|
| 21.15 | 0.40 | 16.62 | 1.24 | 0.60 | 1.82 | 4.03 | 37.05 | 17.09 |

Figure 4A:
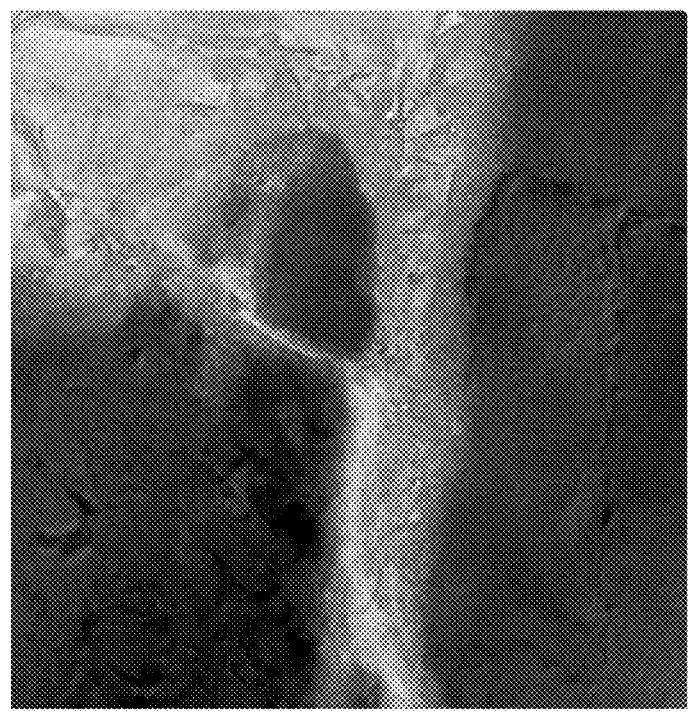
FIGS. 4a and 4b are a brightfield/darkfield TEM image pair of a grain boundary region for inventive alloy 5 of Example 1. In the brightfield 4a the oxide interface is white and the metal regions are dark.
Figure 4B:
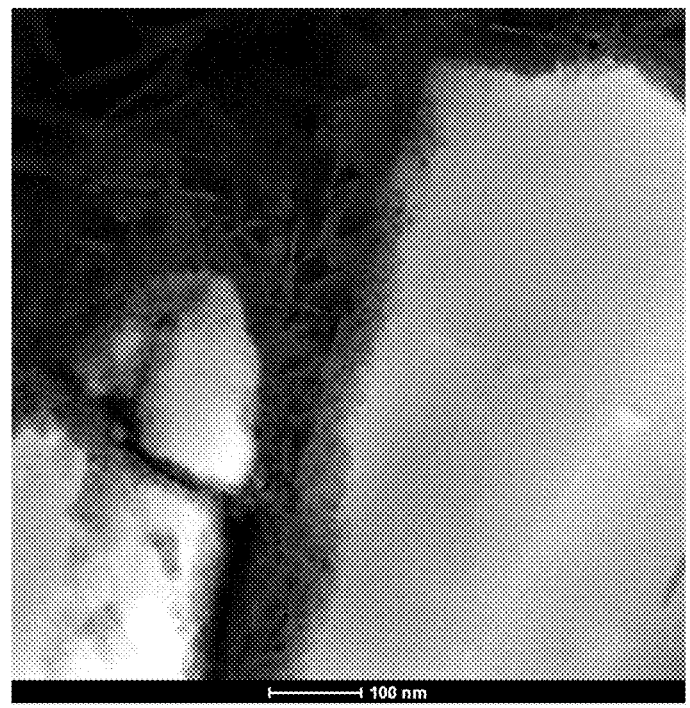

FIGS. 4a and 4b are a brightfield/darkfield TEM image pair of a grain boundary region for inventive alloy 5. A nano-scaled boundary region separating metal regions is visible. A transition zone adjacent to the metal region is visible. The metal region is bright and the metal oxide is dark in the darkfield 4b. Energy loss spectroscopy shows that nickel of the metal region and the transition zone is in the zero oxidation state ($Ni^0$) and that nickel in the oxide region is oxidized ($Ni^{2+/3+}$). The oxide composition of alloy 5, determined by EDS is below.

| O | Al | Ti | V | Cr | Mn | Co | Ni | Zr |
|---|---|---|---|---|---|---|---|---|
| 69.5 | 0.4 | 2.2 | 0.8 | 4.2 | 0.5 | 0.9 | 19.6 | 1.9 |

Figure 5:
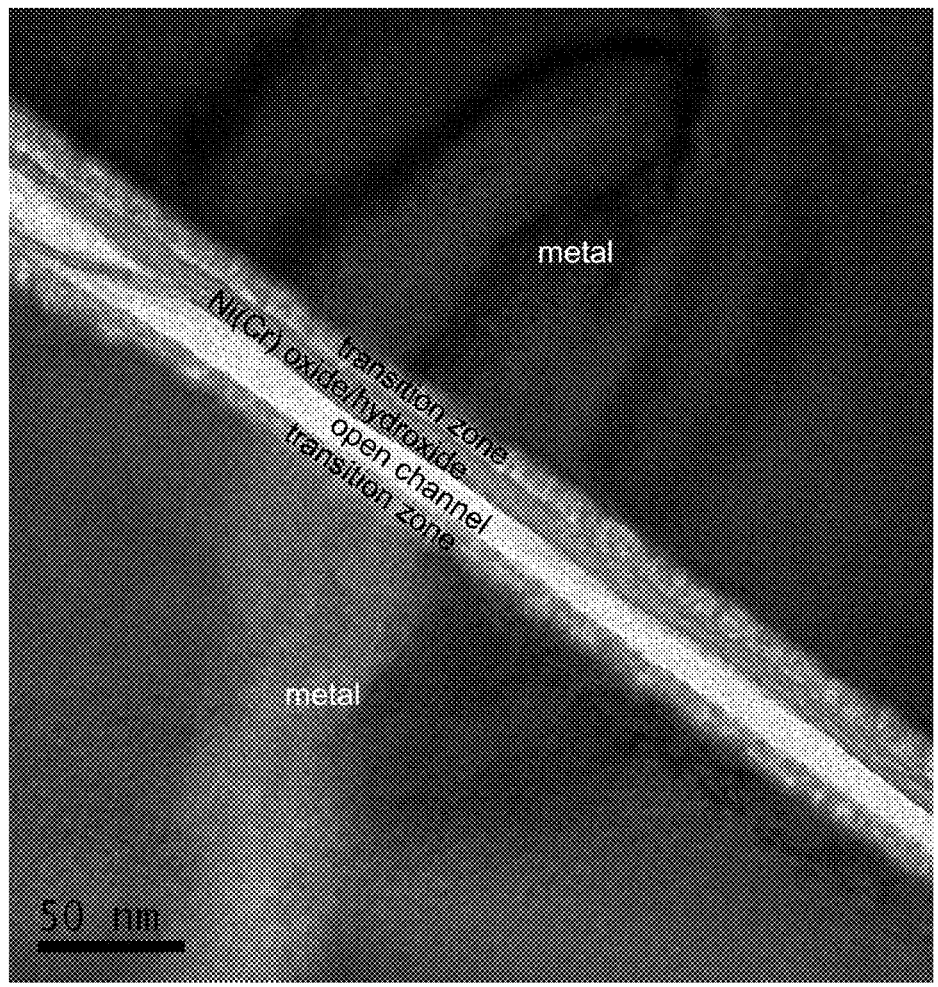
FIG. 5 is a brightfield TEM of a single channel boundary region of alloy 5 of Example 1. The oxide interface is bright and the metal regions are dark.

FIG. 5 is a brightfield TEM of present alloy 5 showing a single channel boundary region between metal regions. The boundary region is bright and the metal regions are dark. The nano-scaled boundary region contains transition zones adjacent to the metal regions, a Ni/Cr oxide zone and an aligned channel. The width of the boundary region is substantially uniform along the length. The transition zones, channel and oxide zone run along the length of the boundary region.

Figure 6:
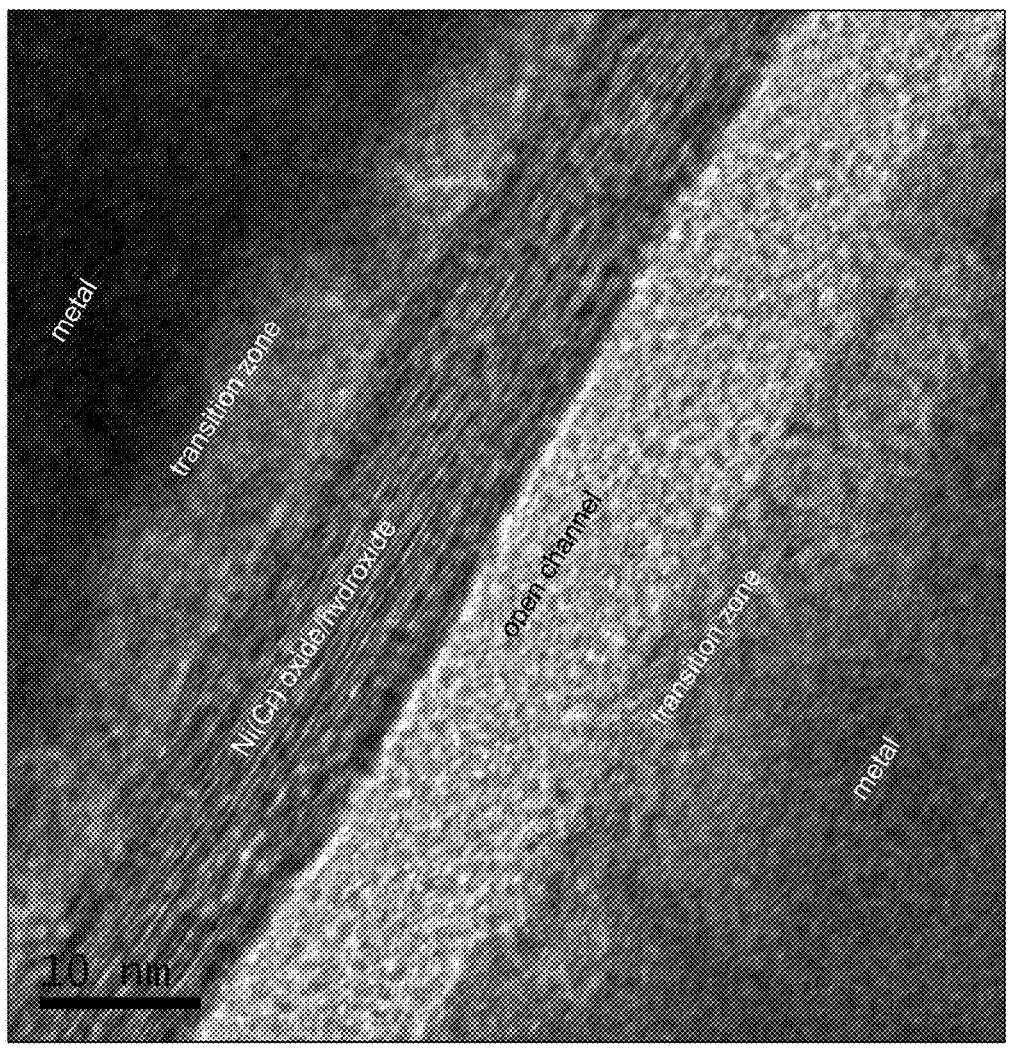
FIG. 6 is an amplified TEM of the single channel boundary region of FIG. 5.

FIG. 6 is an amplified TEM of the single channel boundary region of FIG. 5.

Figure 7:
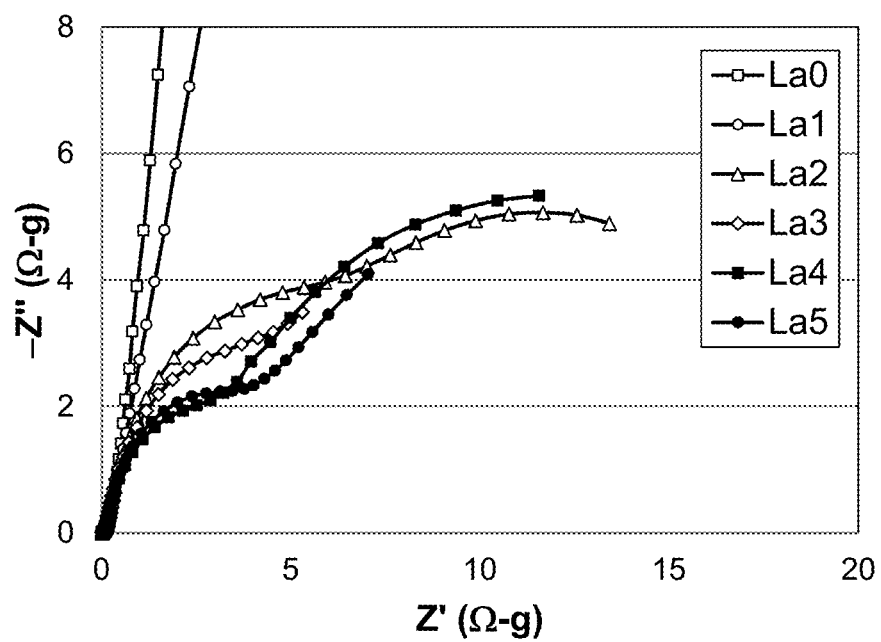
FIG. 7 contains Cole-Cole plots of alloys 0-5 of Example 1 and show that two semi-circles emerge with increasing La content. This indicates two distinct phases participating in the electrochemistry.
Figure 8:
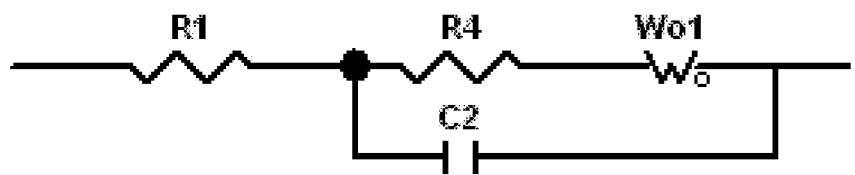
FIG. 8 is the circuitry employed to determine the charge transfer resistance (R2 and R4) and double layer capacitance (C1 and C2) of each phase from the Cole-Cole plots. The base alloy 0 exhibits only a single semi-circle in the Cole-Cole plot, therefore only R4 and C2 are calculated for alloy 0.
Figure 9:
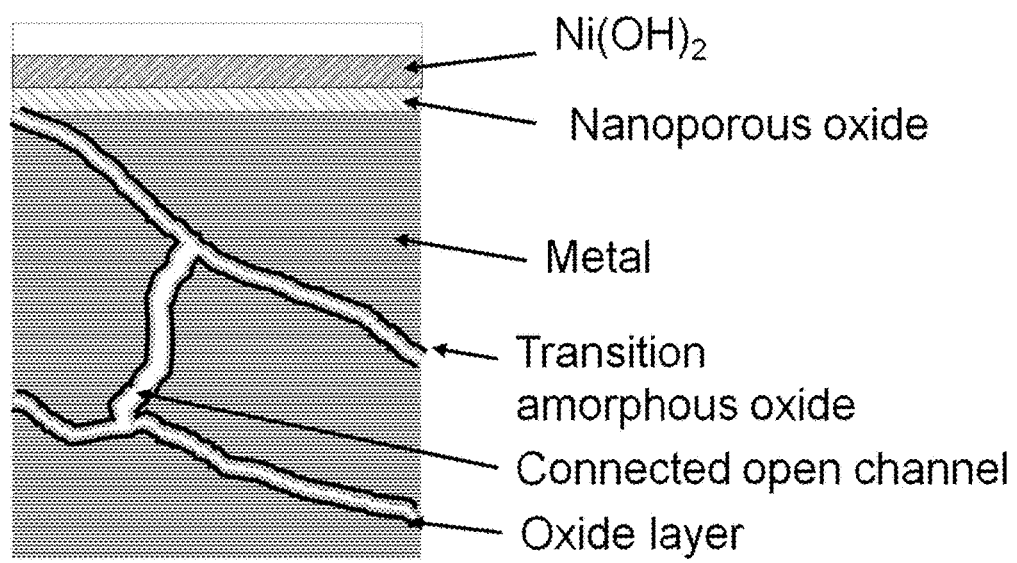
FIG. 9 is a schematic of showing present narrow boundary regions throughout the bulk metal alloy (metal) and comprising transition oxide zones (transition amorphous oxide), metal oxide zones (oxide layer) and an open channel. The nickel hydroxide and nanoporous oxide layers are conventional metal oxides.

The low temperature electrochemical results are below. FIG. 7 shows in the Cole-Cole plots that two semi-circles emerge with increasing La content. This indicates two distinct phases participating in the electrochemistry. The charge transfer resistance (R2 and R4) and double layer capacitance (C1 and C2) of each phase are calculated from the Cole-Cole plots using the circuitry shown in FIG. 8. The base alloy 0 exhibits only a single semi-circle in the Cole-Cole plot, therefore only R4 and C2 are calculated for alloy 0.

The R and C values are calculated from the Cole-Cole plot of AC impedance measurements. AC impedance measurements are conducted with a SOLARTRON 1250 Frequency Response Analyzer with sine wave of amplitude 10 mV and frequency range of 0.1 mHz to 10 kHz. Prior to the measurements, the electrodes are subjected to one full charge/discharge cycle at 0.1 C rate using a SOLARTRON 1470 Cell Test galvanostat, charged to 100% SOC, discharged to 80% SOC, then cooled to −40° C.

| alloy | R1 | R2 | R4 | R2 + R4 | C1 | C2 |
|---|---|---|---|---|---|---|
| 0 | 0.57 | — | 158 | 158 | — | 0.18 |
| 1 | 0.76 | 4.07 | 154 | 158.1 | 1.69 | 1.02 |
| 2 | 0.41 | 9.64 | 5.62 | 15.26 | 2.59 | 0.31 |
| 3 | 0.28 | 10.40 | 4.43 | 14.83 | 4.20 | 0.48 |
| 4 | 0.28 | 9.45 | 3.25 | 12.70 | 7.12 | 0.53 |
| 5 | 0.27 | 7.31 | 3.69 | 11.00 | 6.75 | 0.57 |

Charge transfer resistance, R is in $\Omega \cdot g$. Double layer capacitance, C is in Farad/g. The R and C values are calculated from the Cole-Cole plot of AC impedance measurements performed at −40° C.

It is seen that La-modified alloys 2-5 have vastly improved charge transfer resistance (R2+R4) relative to the comparative alloys (lower values desired).

High rate dischargeability results are below.

| alloy | $3^{rd}$ cycle cap. 50 mA/g | $3^{rd}$ cycle cap. 4 mA/g | HRD (%) | activation cycles to reach 92% HRD |
|---|---|---|---|---|
| 0 | 300 | 376 | 80 | 6 |
| 1 | 340 | 371 | 92 | 4 |
| 2 | 349 | 365 | 96 | 1 |
| 3 | 347 | 364 | 95 | 1 |
| 4 | 331 | 345 | 96 | 1 |
| 5 | 307 | 321 | 96 | 1 |

Half-cell HRD is defined as the ratio of discharge capacity measured at 50 mA $g^{-1}$ to that measured at 4 mA $g^{-1}$. The discharge capacity of an alloy is measured in a flooded cell configuration against a partially pre-charged $Ni(OH)_2$ positive electrode. No alkaline pretreatment is applied before the half-cell measurement. Each sample electrode is charged at a constant current density of 50 mA $g^{-1}$ for 10 h and then discharged at a current density of 50 mA $g^{-1}$ followed by two pulls at 12 and 4 mA $g^{-1}$. Capacities and HRD are measured at the $3^{rd}$ cycle.

BET (Brunauer-Emmett-Teller) surface area for alloy 0 is 1.89 $m^2$/g. BET surface are for alloy 5 is determined to be 4.92 $m^2$/g. BET surface area is measured by the liquid nitrogen dipping BET method.

EXAMPLE 2

Sc, Y or Mischmetal Modified Ti—Zr—V—Cr—Mn—Ni—Al—Co Alloy

Example 1 is repeated, replacing La with Sc, Y and mischmetal.

The invention claimed is:

1. A hydrogen storage alloy comprising
   i) at least one main phase and
   ii) a secondary phase comprising La and Ni,
   wherein the alloy comprises a bulk metal region adjacent to a metal oxide boundary region, which boundary region comprises at least one channel capable of allowing transport of electrolyte to the bulk metal region,
   wherein the alloy comprises about 11 at % to about 13 at % Ti, about 18 at % to about 23 at % Zr, about 9 at % to about 11 at % V, about 6 at % to about 9 at % Cr, about 6 at % to about 9 at % Mn, about 31 at % to about 34 at % Ni, about 0.3 at % to about 0.6 at % Al, about 2 at % to about 8 at % Co and about 1 at % to about 7 at % La, based on the total alloy, and
   wherein the alloy exhibits
   a charge transfer resistance (R) at −40° C. of from about 5 to about 20 $\Omega \cdot g$; and/or
   a surface catalytic ability for the main phase or main phases at −40° C. of from about 1 to about 5 seconds; and/or
   a charge transfer resistance for the main phase or main phases (R) at −40° C. of ≤10 $\Omega \cdot g$.

2. A hydrogen storage alloy according to claim 1, where the boundary region comprises a Ni/Cr metal oxide.

3. An alloy according to claim 2 where the Ni/Cr oxide contains 60 at % oxygen.

4. An alloy according to claim 2 where the Ni/Cr oxide contains from about 2 at % to about 8 at % Cr.

5. An alloy according to claim 2 where the Ni/Cr oxide contains from about 16 at % to about 23 at % Ni.

6. An alloy according to claim 2 where the Ni/Cr oxide contains from about 64 at % to about 71 at % oxygen, from about 3 at % to about 8 at % Cr and from about 16 at % to about 21 at % Ni.

7. An alloy according to claim 2 where the Ni/Cr oxide contains oxygen, Ni, Cr and one or more further elements selected from the group consisting of Al, Ti, V, Mn, Co and Zr.

8. An alloy according to claim 1 where the boundary region has a length and an average width and comprises at least one channel which runs along the length of the boundary region.

9. An alloy according to claim 1 where the boundary region comprises at least one channel which has an average width of from about 4 nm to about 40 nm.

10. An alloy according to claim 1 where the boundary region has a length and an average width and further comprises a transition oxide zone adjacent to a metal region which transition zone runs along the length of the boundary region.

11. An alloy according to claim 10 where the transition zone has an average width of from about 4 nm to about 30 nm.

12. An alloy according to claim 1 where the boundary region has a length and an average width and comprises a metal oxide zone which runs along the length of the boundary region.

13. An alloy according to claim 12 where the metal oxide zone which has an average width of from about 5 nm to about 500 nm.

14. An alloy according to claim 1 where the boundary region has a length and an average width and comprises across the width a first transition oxide zone, a metal oxide zone and a second transition oxide zone, each running along the length of the boundary region.

15. An alloy according to claim 1 where the boundary region has a length and an average width and comprises across the width a first transition oxide zone, a channel and a second transition oxide zone, each running along the length of the boundary region.

16. An alloy according to claim 1 where the boundary region has a length and an average width and comprises across the width a first transition oxide zone, a metal oxide zone, a channel and a second transition oxide zone, each running along the length of the boundary region.

17. An alloy according to claim 1 where the boundary region has a length and an average width, where the length is ≥4 times the average width and where the width is substantially uniform along the length.

18. An alloy according to claim 1 where the boundary region has an average width of from about 17 nm to about 600 nm.

19. An alloy according to claim 1 comprising from about 1.5 at % to about 7.0 at % La.

20. An alloy according to claim 1 comprising a C14 or C15 main Laves phase or comprising C14 and C15 main Laves phases.

21. An alloy according to claim 1 comprising
 a C14 or C15 main Laves phase or C14 and C15 main Laves phases,
 >0.5 wt % of a storage secondary phase comprising La and Ni and
 from about 0.3 wt % to about 15 wt % of a catalytic secondary phase comprising Ti and Ni.

22. A metal hydride battery, a solid hydrogen storage media, an alkaline fuel cell or a metal hydride air battery comprising a hydrogen storage alloy according to claim 1.

23. An alloy according to claim 1, which exhibits
 a charge transfer resistance (R) at −40° C. of from about 5 to about 20 Ω·g; and
 a surface catalytic ability for the main phase or main phases at −40° C. of from about 1 to about 5 seconds.

24. An alloy according to claim 1, which exhibits
 a surface catalytic ability for the main phase or main phases at −40° C. of from about 1 to about 5 seconds; and
 a charge transfer resistance (R) at −40° C. for the main phase or main phases of ≤10 Ω·g.

25. An alloy according to claim 1, which exhibits
 a charge transfer resistance (R) at −40° C. of from about 5 to about 20 Ω·g;
 a surface catalytic ability for the main phase or main phases at −40° C. of from about 1 to about 5 seconds; and
 a charge transfer resistance (R) at −40° C. for the main phase or main phases of ≤10 Ω·g.

26. An alloy according to claim 1, comprising from about 2.0 to about 7.0 atomic percent La.

27. An alloy according to claim 1, comprising from about 4.0 to about 7.0 atomic percent La.

* * * * *